(12) United States Patent
Hayashi

(10) Patent No.: US 9,897,496 B2
(45) Date of Patent: Feb. 20, 2018

(54) STRESS MEASURING METHOD, STRESS MEASURING MEMBER, AND STRESS MEASURING SET

(71) Applicant: FUJIFILM Corporation, Tokyo (JP)

(72) Inventor: Takahiro Hayashi, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/292,469

(22) Filed: Oct. 13, 2016

(65) Prior Publication Data
US 2017/0030785 A1    Feb. 2, 2017

Related U.S. Application Data

(63) Continuation of application No. PCT/JP2015/061313, filed on Apr. 13, 2015.

(30) Foreign Application Priority Data

Apr. 14, 2014  (JP) ................................ 2014-082454

(51) Int. Cl.
*G01B 11/16*   (2006.01)
*G01L 1/24*    (2006.01)
*C08G 61/00*   (2006.01)

(52) U.S. Cl.
CPC .............. *G01L 1/241* (2013.01); *C08G 61/00* (2013.01); *G01B 11/16* (2013.01)

(58) Field of Classification Search
CPC .................................. G01L 1/241; G01B 11/16
See application file for complete search history.

(56) References Cited

U.S. PATENT DOCUMENTS 5,270,781 A * 12/1993 Singh ...................... G01L 1/247
                                                              349/169
5,438,879 A *  8/1995 Reda ..................... G01B 11/162
                                                              73/800
(Continued)

FOREIGN PATENT DOCUMENTS

JP      4-118537 A    4/1992
JP      5-27119 A     2/1993
(Continued)

OTHER PUBLICATIONS

International Search Report, issued in PCT/JP2015/051313, dated Jun. 9, 2015.
(Continued)

*Primary Examiner* — Kara E Geisel
*Assistant Examiner* — Maurice Smith
(74) *Attorney, Agent, or Firm* — Birch, Stewart, Kolasch & Birch, LLP

(57) ABSTRACT

The present invention provides a stress measuring method including: irradiating a photoelastic product including a measurement subject with light penetrating a linear polarizing film and a phase difference film in this order, and detecting reflected light from the product which is derived from the light via the phase difference film and the linear polarizing film in this order, in which in-plane retardation Re (550) of the phase difference film with light having a wavelength of 550 nm satisfies 100 nm≤Re (550)≤700 nm, and in-plane retardation Re (450) of the phase difference film with light having a wavelength of 450 nm satisfies Re (450)/Re (550)≥0.9, a stress measuring member including the linear polarizing film and the phase difference film, and a stress measuring set including the stress measuring member and a stress displaying member including a photoelastic layer.

15 Claims, 2 Drawing Sheets

(56) References Cited

U.S. PATENT DOCUMENTS

| | | | | |
|---|---|---|---|---|
| 5,589,931 | A * | 12/1996 | Rapoport | G01L 11/02 356/33 |
| 6,778,236 | B1 * | 8/2004 | Crawford | G01B 11/165 33/501 |
| 8,264,675 | B1 * | 9/2012 | Danyluk | G01B 11/168 356/33 |
| 2004/0066503 | A1 * | 4/2004 | Hubner | G01L 1/241 356/34 |
| 2011/0064930 | A1 * | 3/2011 | Hirayama | B32B 27/36 428/220 |
| 2012/0003402 | A1 * | 1/2012 | Ohashi | B32B 7/12 428/1.1 |
| 2012/0123112 | A1 * | 5/2012 | Buchanan | C08B 1/003 536/63 |
| 2015/0253480 | A1 * | 9/2015 | Ren | G02B 5/3083 359/489.07 |

FOREIGN PATENT DOCUMENTS

| | | |
|---|---|---|
| JP | 5-79927 A | 3/1993 |
| JP | 7-2050 U | 1/1995 |
| JP | 7-35629 A | 2/1995 |
| JP | 2005-31557 A | 2/2005 |
| WO | WO 2008/013022 A1 | 1/2008 |

OTHER PUBLICATIONS

Written Opinion of the International Searching Authority, issued in PCT/JP2015/061313, dated Jun. 9, 2015.

English Translation of International Preliminary Report on Patentability (PCT/IB/373) for PCT/JP2015/061313, dated Oct. 18, 2016.

English Translation of International Search Report (PCT/ISA/210) for PCT/JP2015/061313, dated Jun. 9, 2015.

English Translation of Written Opinion of the International Searching Authority (PCT/ISA/237) for PCT/JP2015/061313, dated Jun. 9, 2015.

Japanese Office Action with Machine Translation dated Jun. 20, 2017, issued in Japanese Patent Application No. 2016-513768.

Japanese Office Action and English translation, dated Sep. 26, 2017, for corresponding Japanese Application No. 2016-513768.

\* cited by examiner

| 2 |
|---|
| 1 |

| 2 |
|---|
| 1 |
| 3 |

| 2 |
|---|
| 1 |
| 4 |
| 3 |

| 2 |
|---|
| 1 |
| 13 |
| 11 |

| 2 |
|---|
| 1 |
| 13 |
| 11 |
| 12 |

| 2 |
|---|
| 1 |
| 13 |
| 11 |
| 12 |
| 16 |

STRESS MEASURING METHOD, STRESS MEASURING MEMBER, AND STRESS MEASURING SET

CROSS-REFERENCE TO RELATED APPLICATIONS

This application is a continuation of PCT International Application No. PCT/JP2015/061313 filed on Apr. 13, 2015, which claims priority under 35 U.S.C § 119 (a) to Japanese Patent Application No. 2014-082454 filed on Apr. 14, 2014. The entire content of each of the above applications is incorporated herein by reference.

BACKGROUND OF THE INVENTION

1. Field of the Invention

The present invention relates to a stress measuring method, a stress measuring member, and a stress measuring set. Specifically, the invention relates to a stress measuring method using photoelasticity, a stress measuring member, and a stress measuring set used in the measuring method.

2. Description of the Related Art

As a measuring method of a stress (distortion) of an object, a method using photoelasticity is known in the related art.

JP1992-118537A (JP-H04-118537A) discloses measuring a torque of a rotator by irradiating a photoelastic coated film formed on a surface of a measurement subject with polarization and detecting the intensity (brightness) of light.

JP1993-79927A (JP-1105-79927A) discloses a method of detecting a stress as a color by observing a target of stress measurement obtained by attaching a photoelastic gauge on a surface, via a linear polarizing plate and a ¼ wavelength plate.

SUMMARY OF THE INVENTION

In a case where, for example, a photoelastic layer is used in a stress measuring method using photoelasticity, it is required to make a film thickness of the photoelastic layer large, in order to detect a small distortion amount change as a change of a color. If the photoelastic layer becomes thick, stiffness increases. Therefore, particularly, in a case where a measurement subject has a thin form or a soft material, the photoelastic layer influences distortion of the measurement subject. As a result, there is a problem that the distortion becomes different from actual distortion in a case of applying a predetermined load to the measurement subject, and thus becomes a cause of a measurement error.

If the stiffness of the photoelastic layer is great, shape followability with respect to a surface shape of the measurement subject becomes poor, and thus measurement targets can be limited. If a method of solidifying a liquid photoelastic material on a surface of a measurement subject in order to increase shape followability of a photoelastic layer having great film thickness is employed, application thereof may become difficult depending on a location or a shape of the measurement subject, and it may not be possible to make the film thickness homogeneous with high accuracy.

An object of the invention is to provide a stress measuring method having high accuracy and sensitivity and to provide a stress measuring member and a stress measuring set that make stress measurement with high accuracy and sensitivity possible. An object of the invention is to provide a method having high accuracy and sensitivity, as a stress measuring method for detecting distortion with a color change using photoelasticity and to provide a stress measuring member and a stress measuring set that can be used in this method.

The present inventors diligently conducted research in order to achieve the objects described above. With respect to a method using a photoelastic layer, the present inventors have found a condition in which measurement of small distortion becomes possible in a process of scanning optical characteristics of a member for observing a photoelastic layer and have completed the invention based on this knowledge.

That is, the invention is to provide [1] to [17] below.

[1] A stress measuring method comprising: irradiating a photoelastic product including a measurement subject with light penetrating a linear polarizing film and a phase difference film in this order, and detecting reflected light from the product which is derived from the light via the phase difference film and the linear polarizing film in this order, in which in-plane retardation Re (550) of the phase difference film with light having a wavelength of 550 nm satisfies 100 nm≤Re (550 nm)≤700 nm, and in-plane retardation Re (450) of the phase difference film with light having a wavelength of 450 nm satisfies Re (450)/Re (550)≥0.9.

[2] The stress measuring method according to [1], further comprising: preparing the photoelastic product by adhering a stress displaying member including a photoelastic layer to a surface of the measurement subject.

[3] The stress measuring method according to [1], further comprising: preparing the photoelastic product by adhering a stress displaying member including a photoelastic layer and a reflection layer to a surface of the measurement subject, such that the reflection layer is on the measurement subject side.

[4] The stress measuring method according to [2] or [3], in which a film thickness of the photoelastic layer is 10 μm to 1 mm.

[5] The stress measuring method according to any one of [2] to [4], in which the photoelastic layer includes an aromatic compound.

[6] A stress measuring member, comprising: a linear polarizing layer; and a phase difference layer, in which in-plane retardation Re (550) of the phase difference layer with light having a wavelength of 550 nm satisfies 100 nm≤Re (550 nm)≤700 nm, and in-plane retardation Re (450) of the phase difference film with light having a wavelength of 450 nm satisfies Re (450)/Re (550)≥0.9.

[7] The stress measuring member according to [6], further comprising: a photoelastic layer, in which the linear polarizing layer, the phase difference layer, and the photoelastic layer are arranged in this order.

[8] The stress measuring member according to [6], further comprising: a photoelastic layer; and a reflection layer, in which the linear polarizing layer, the phase difference layer, the photoelastic layer, and the reflection layer are arranged in this order.

[9] The stress measuring member according to [7] or [8], further comprising: an adhesion layer for adherence to a measurement subject, in which the linear polarizing layer, the phase difference layer, the photoelastic layer, and the adhesion layer are arranged in this order.

[10] The stress measuring member according to any one of [7] to [9], in which a film thickness of the photoelastic layer is 10 μm to 1 mm.

[11] The stress measuring member according to any one of [7] to [10], in which the photoelastic layer includes an aromatic compound.

[12] A stress measuring set, comprising: a stress measuring member; and a stress displaying member, in which the stress measuring member includes a linear polarizing layer and a phase difference layer, in which in-plane retardation Re (550) of the phase difference layer with light having a wavelength of 550 nm satisfies 100 nm≤Re (550 nm)≤700 nm, and in-plane retardation Re (450) of the phase difference film with light having a wavelength of 450 nm satisfies Re (450)/Re (550)≥0.9, and in which the stress displaying member includes a photoelastic layer.

[13] The stress measuring set according to [12], in which the stress displaying member includes a reflection layer.

[14] The stress measuring set according to [12], in which the stress displaying member includes an adhesion layer.

[15] The stress measuring set according to [13], in which the stress displaying member includes an adhesion layer, and in which the photoelastic layer, the reflection layer, and the adhesion layer are arranged in this order.

[16] The stress measuring set according to any one of [12] to [15], in which a film thickness of the photoelastic layer is 10 μm to 1 mm.

[17] The stress measuring set according to any one of [12] to [16], in which the photoelastic layer includes an aromatic compound.

The invention provides a stress measuring method having high accuracy and sensitivity and a stress measuring member that can make stress measurement having high accuracy and sensitivity possible. According to the stress measuring method and the stress measuring member of the invention, a small distortion amount change can be detected as a change of a color. For example, even in a case where a photoelastic layer having a film thickness in a predetermined range in which shape followability with respect to a surface shape of a measurement subject can be maintained is used, stress measurement having high accuracy and sensitivity becomes possible.

DESCRIPTION OF THE PREFERRED EMBODIMENTS

Figure 1:
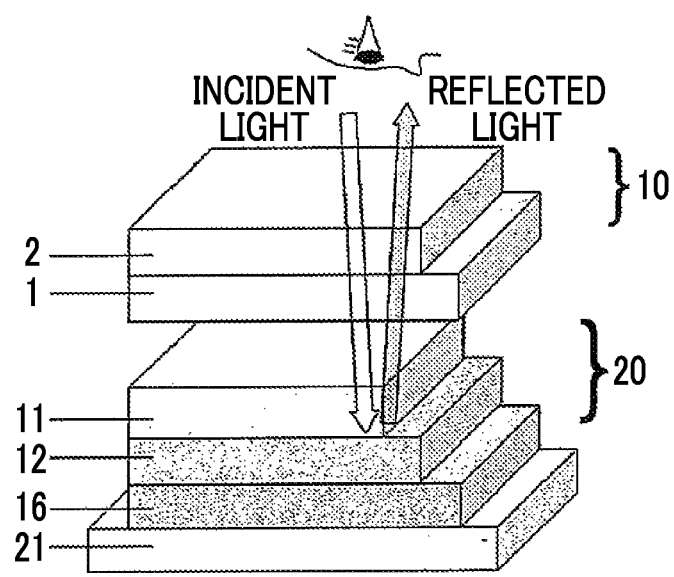
FIG. 1 is a diagram schematically illustrating arrangement of respective layers in a case where a stress of a measurement subject is measured and a relationship between a light incident direction and an observation direction.

Hereinafter, details of the invention are described.

In this specification, the expression "to" is used in the meaning of including numerical values described before and after the expression as a lower limit and an upper limit. With respect to an angle, in a case where a description of an angle such as "45°", "orthogonal", and "parallel" is described, the expressions mean angles in a range of ±10° of exact angles. The "identical" and "different" angles may be determined based on whether the difference is less than 5° or not.

In this specification, in a case of "light", the expression means visible light (natural light), unless described otherwise.

In this specification, "phase difference" and "retardation" refer to inplane retardation. Retardation at wavelength λ is denoted by Re(λ), and retardation in a case where there is not a special note with respect to a wavelength refers to retardation at a wavelength of 550 nm. Retardation at each measurement wavelength is represented by $|n_x-n_y| \times d$ when $n_x$ is a refractive index in an x axis direction, $n_y$ is a refractive index in a y axis direction, and d is thickness. In this specification, the retardation is measured by causing light at a wavelength of λ nm to be incident in the normal direction of a measurement target in a film form by using a polarization phase difference analyzer AxoScan manufactured by AXOMETRICS, Inc. Re (λ) can be measured by causing light at a wavelength of λ nm to be incident to KOBRA 21ADH or WR (manufactured by Oji Scientific Instruments) in a normal direction of a film.

In this specification, photoelasticity refers to properties of generating birefringence since optical anisotropy occurs in an object in which stress occurs. Phase difference occurs due to birefringence, and phase difference that occurs for each unit stress and for each unit optical path is called a photoelastic coefficient.

In this specification, a "distortion amount" refers to a deformation amount for each unit length in a case where stress occurs in an object. Specifically, in a case where an object in a length L is stretched by ΔL due to tensile stress, or in a case where a length L shrinks by ΔL, a value represented by ΔL/L refers to a distortion amount.

<Stress Measuring Method Using Photoelasticity>

In a case where stress occurs in a photoelastic object, birefringence occurs. Therefore, stress distribution, that is, distortion distribution can be measured by detecting a change in a polarization state according to a birefringence amount.

As a stress measuring method using photoelasticity, a photoelastic method and a photoelastic coating method have been known in the related art. The photoelastic method is a method for detecting a polarization state of light that penetrates a photoelastic material and enables to evaluate stress inside the material, but a measurement target is limited to a transparent body. Therefore, in a case of measuring distortion of an opaque material such as metal, a material, ceramics, or the like, a photoelastic coating method for providing a photoelastic layer by adhering a photoelastic material to a surface of a measurement subject, irradiating the photoelastic layer with light, detecting a polarization state of the obtained reflected light, and measuring surface distortion of a measurement subject is used.

In an optical system of a photoelastic method, for example, two sheets of linear polarizing films called a polarizer and an analyzer are used. At this point, the polarization direction of a polarizer and an analyzer is orthogonal. A photoelastic material is irradiated with light from the polarizer side, and light penetrating the photoelastic material is observed from the analyzer side. In the photoelastic coating method, the polarizer and the analyzer may be arranged to be parallel to each other in a polarization direction, and one sheet of linear polarizing film may serve both as a polarizer and an analyzer. A photoelastic measurement subject is irradiated with light via the polarizer, light that penetrates the measurement subject, is reflected, and penetrates the analyzer is observed.

Since a polarization state does not change in a portion in which a main axis direction of the polarizer and a main stress direction of the measurement subject are identical to each other, a line called an isoclinic line is observed. If the polarizer is rotated, the isoclinic line changes such that the main stress direction of the measurement subject can be evaluated. In an area other than the isoclinic line, the light penetrating the measurement subject elliptically polarized due to phase difference by photoelasticity. If monochromatic light is used as a light source, brightness changes according to ellipticity, and thus a brightness streak pattern which corresponds to a phase difference amount and is called an isochromatic line is observed and a distortion amount can be quantatively evaluated from a fringe order. If white light is used as light source, an isochromatic line is displayed by colors.

In the measurement above, if a circular polarization film is used instead of the linear polarizing film, isoclinic lines are not exhibited, and only isochromatic lines are exhibited. For example, the circular polarization film is obtained by laminating a so-called λ/4 phase difference film having phase differences corresponding to λ/4 with respect to each wavelengths λ of the visible light region, such that an angle formed by an absorption axis of the linear polarizing film and a slow axis of the λ/4 phase difference film becomes 45°.

According to the stress measuring method according to the invention, a linear polarizing film and a phase difference film having specific optical characteristics are used. If the linear polarizing film and the phase difference film are used in combination, the polarization state of the measurement subject can be observed. The polarization state is observed with colors, and can be converted to a distortion amount by a method described below. According to the usage of a linear polarizing film and a phase difference film having specific optical characteristics in combination, both of the isoclinic line and the isochromatic line can be observed.

In the stress measuring method according to the invention, colors are different from each other in a case where compressive stress occurs and in a case where tensile stress occurs in a measurement subject in a slow axis direction of the phase difference film, and thus observed colors are different according to the main stress direction of the inplane of the measurement subject surface and the angle of the slow axis of the phase difference film. Therefore, if the polarization film and the phase difference film are rotated at the same time by arranging the linear polarizing film and the phase difference film to be parallel to the surface of the measurement subject while the films are maintained to be parallel, the colors change. According to the change of the colors when the linear polarizing film and the phase difference film are rotated, a distortion direction and a distortion amount can be evaluated.

It is preferable that the absorption axis of the linear polarizing film and the slow axis of the phase difference film are arranged to form 45°. The phase difference film and the linear polarizing film may be independently prepared and overlapped with each other to be used, and a film in which the linear polarizing film and the phase difference film are integrated may be used. The phase difference film may be used as a phase difference layer which is a portion of the stress measuring member.

<Phase Difference Film (Phase Difference Layer)>
[Optical Characteristics of Phase Difference Film]

In-plane retardation Re (550) of the phase difference film with light having a wavelength of 550 nm satisfies 100 nm≤Re (550 nm)≤700 nm. If the phase difference film having Re (550 nm) in the range described above is used, a satisfactory color change can be recognized. The range thereof is preferably 100 nm≤Re (550 nm)≤200 nm or 300 nm≤Re (550 nm)≤700 nm, more preferably 120 nm≤Re (550 nm)≤60 nm or 300 nm≤Re (550 nm)≤650 nm, even more preferably 300 nm≤Re (550 nm)≤650 nm, and particularly preferably 350 nm≤Re (550 nm)≤500 nm.

In-plane retardation Re (450) of the phase difference film with light having a wavelength of 450 nm satisfies Re (450)/Re (550)≥0.9. Retardation of the phase difference film may have wavelength dispersion for changing the measurement wavelength, but the present inventors have found that the detection sensitivity of the stress measuring member increases in a case where a phase difference film having wavelength dispersion satisfying Re (450)/Re (550)≥0.9 is used. That is, the present inventors have found that a color change is more easily recognized according to the change of the photoelasticity of the measurement subject. The range thereof is more preferably Re (450)/Re (550)≥1, even more preferably Re (450)/Re (550)≥1.05, and particularly preferably Re (450)/Re (550)≥1.1. The upper limit is not particularly limited, but the upper limit is preferably Re (450)/Re (550)≤1.5. For example, values in which Re (450)/Re (550)=1.07, Re (450)/Re (550)=1.12, and the like are suitable.

The film thickness of the phase difference film may be 1 μm to 1,000 μm, is preferably 1 μm to 200 μm, and more preferably 1 μm to 100 μm.

The phase difference film may include plural layers. That is, the optical characteristics may be achieved by the laminate of the plural layers. Plural phase difference films may be directly laminated or may be laminated by using an adhesion layer described below.

[Types of Phase Difference Films]

The phase difference film includes a stretching film, a hardened film obtained by hardening a composition including a molecule having birefringence such as a liquid crystal compound, an inorganic material film having a microstructure, and an inorganic material film having birefringence. Among these, a stretching film or a hardened film is preferable since it is possible to obtain an inexpensive phase difference layer in a large area. Particularly, a hardened film obtained by hardening a liquid crystal composition including a liquid crystal compound enables to obtain desired retardation by controlling a film thickness and birefringence due to molecule alignment.

(Stretching Film)

The stretching film is not particularly limited, may be a monoaxial stretching film or may be a biaxial stretching film. However, the stretching film is preferably a monoaxial stretching film. The stretching condition is not particularly limited. For example, the stretching can be performed with reference to JP2009-214441A.

Examples of the stretching film include stretching films of polymers such as polycarbonate, modified polycarbonate, polyimide, a cycloolefin polymer, a cycloolefin copolymer, polymethyl methacrylate, polyethylene terephthalate, glycol modified polyethylene terephthalate (PETG), polyethylene naphthalate, polyethylene, polypropylene, triacetyl cellulose, and polyvinyl chloride. As a commercially available product, for example, ZD FILM manufactured by ZEON Corporation, PUREACE (T-138, TT-138, T-570, and TT-570) and PUREACE WR (S-148, W-142) manufactured by Teijin Limited, R-FILM manufactured by Kaneka Corporation (R40, R435, and R570), OXIS and OXIS-ZERO manufactured by Okura Industrial Co., Ltd., and ARTON manufactured by JSR Corporation can be used.

The film thickness of the stretching film may be 1 μm to 1,000 μm, preferably 1 μm to 200 μm, and more preferably 1 μm to 100 μm.

(Hardened Film Obtained by Hardening Liquid Crystal Composition)

A polymerizable liquid crystal composition used in the liquid crystal compound may be a rod-shaped liquid crystal compound or a disk-shaped liquid crystal compound, but a rod-shaped liquid crystal compound is preferable. Examples of the rod-shaped liquid crystal compound include a rod-shaped smectic liquid crystal compound or a rod-shaped nematic liquid crystal compound, and azomethines, azoxys, cyanobiphenyls, cyanophenyl esters, bezoic acid esters, cyclohexane carboxylic acid phenyl esters, cyanophenyl cyclohexanes, cyano-substituted phenylpyrimidines, alkoxy-substituted phenylpyrimidines, phenyl dioxanes, tolans, and alkenyl cyclohexyl benzonitriles are preferably used. It is possible to use not only a low-molecular weight liquid crystal compound but also a macromolecular liquid crystal compound. The polymerizable liquid crystal compound can be obtained by introducing a polymerizable group to a liquid crystal compound. Examples of the polymerizable group include an unsaturated polymerizable group, an epoxy group, and an aziridinyl group, an unsaturated polymerizable group is preferable, and an ethylenically unsaturated polymerizable group is particularly preferable. The polymerizable group can be introduced to the molecule of the liquid crystal compound by various methods. The number of polymerizable groups that the polymerizable liquid crystal compound has is preferably 1 to 6, and more preferably 1 to 3.

Specific examples of the rod-shaped liquid crystal compound include compounds disclosed in JP2008-281989A, JP1999-513019A (JP-H11-513019A) (WO97/00600), and JP2006-526165A, and particularly compounds below are exemplified.

I-1
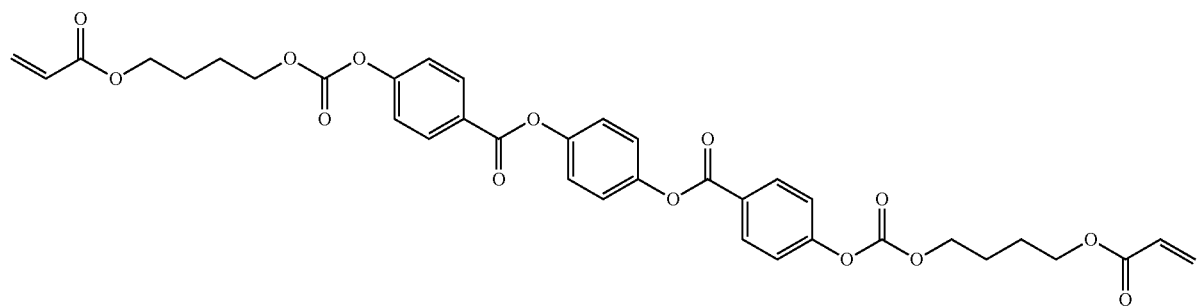

I-2
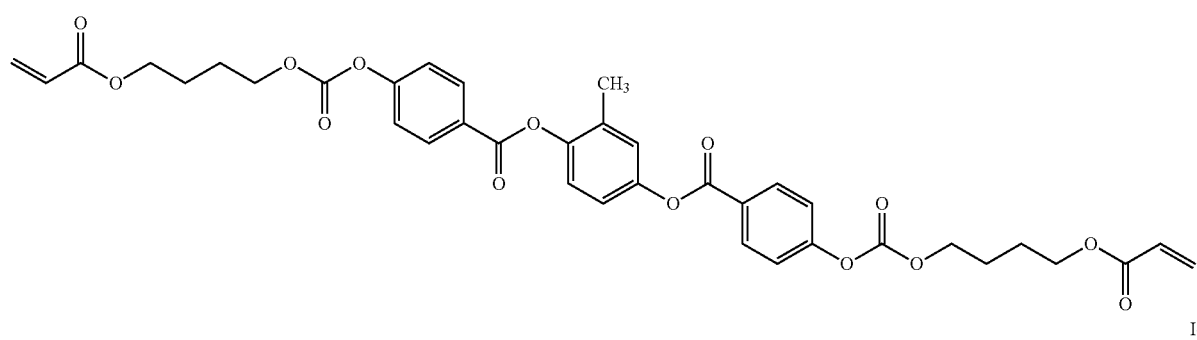

I-3
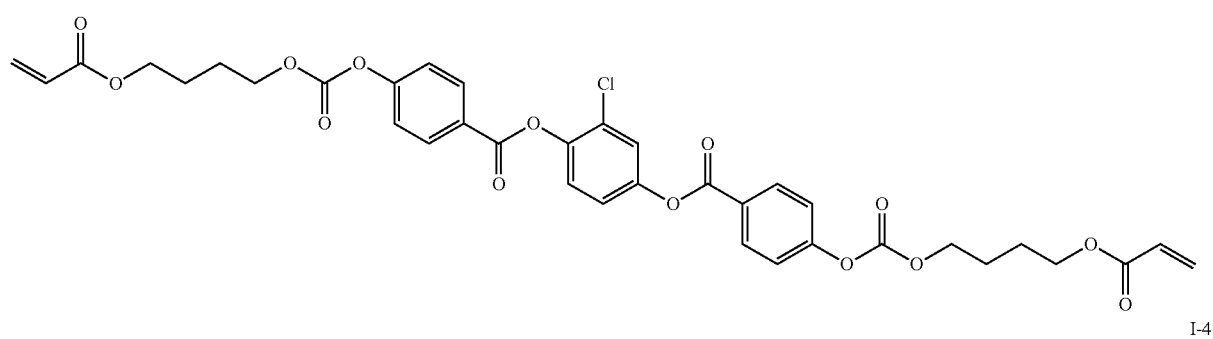

I-4
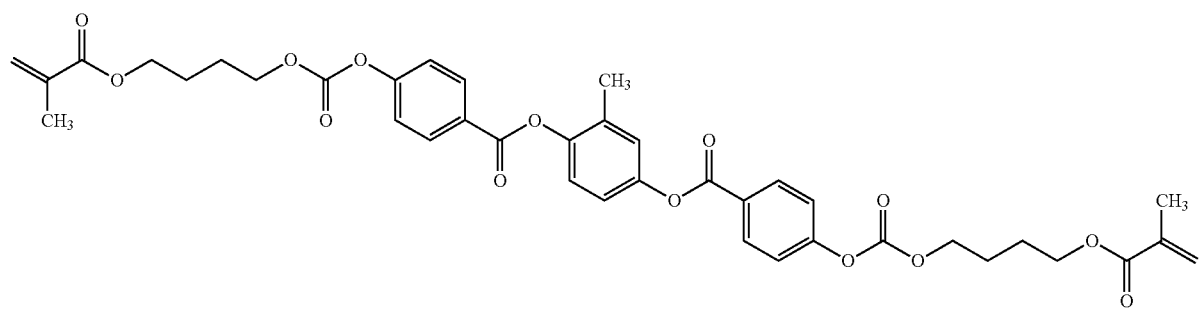

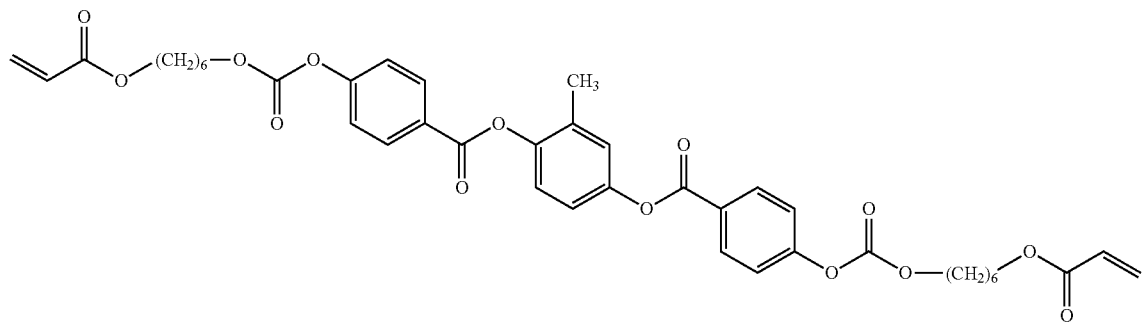
I-5
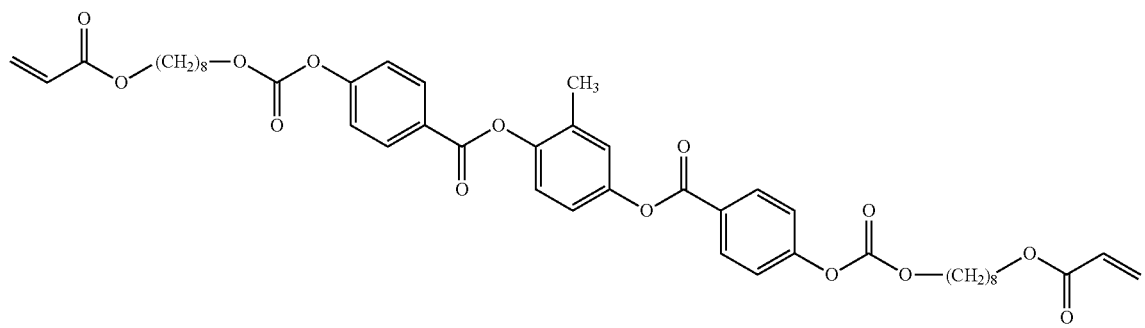
I-6
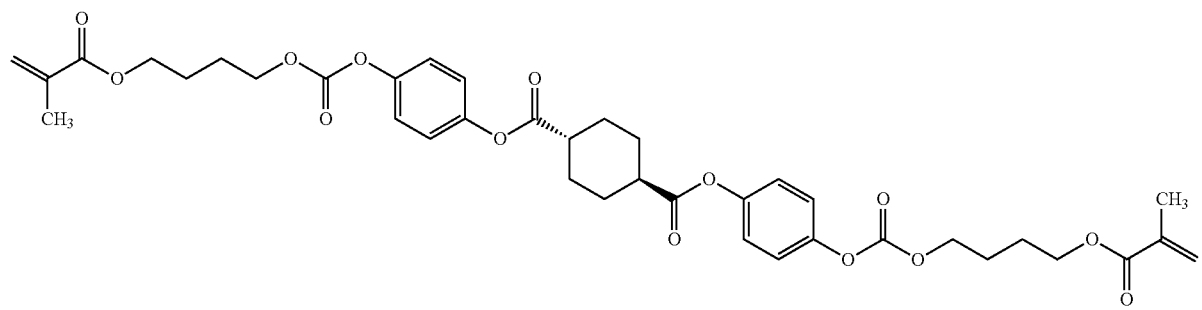
I-7
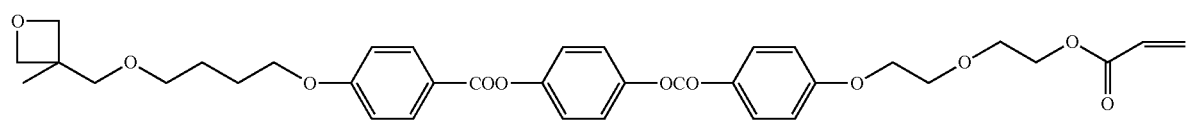
I-8
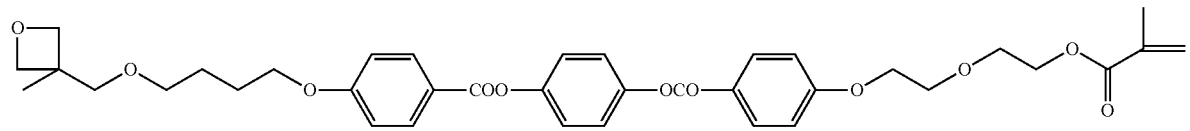
I-9
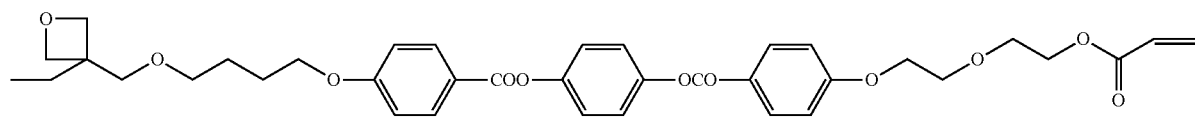
I-10
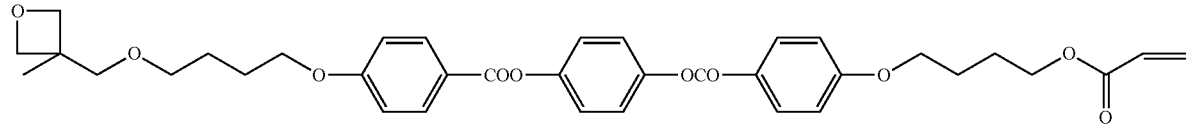
I-11

I-12
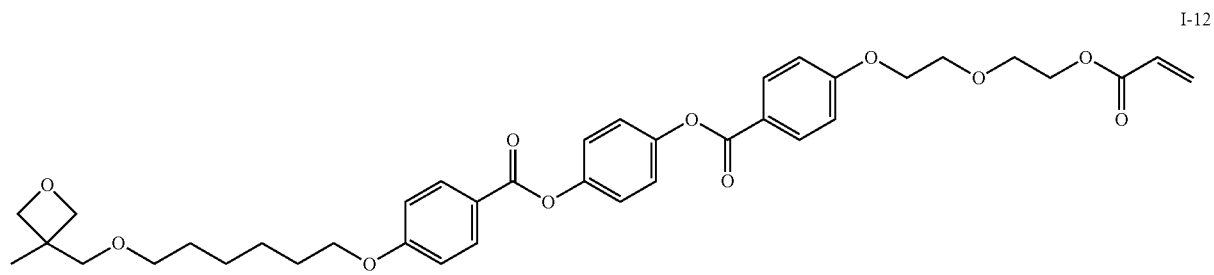
I-13
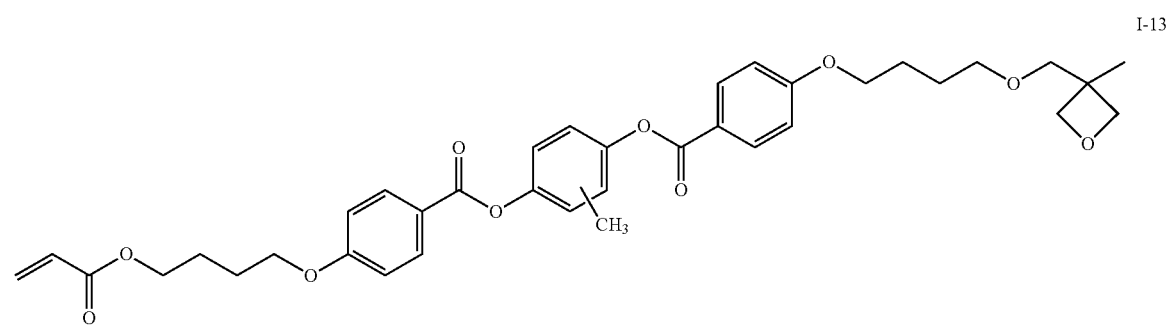
I-14
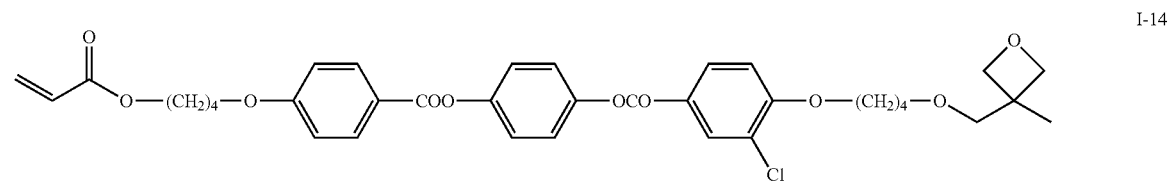
I-15
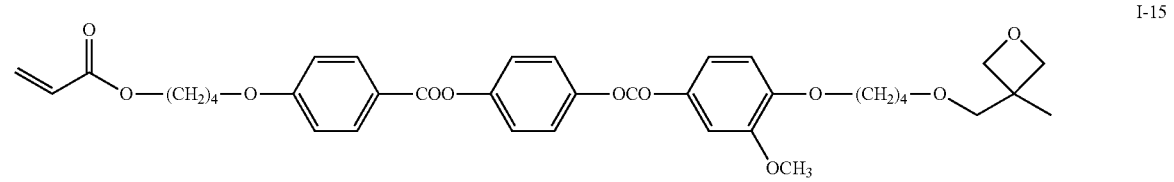
I-16
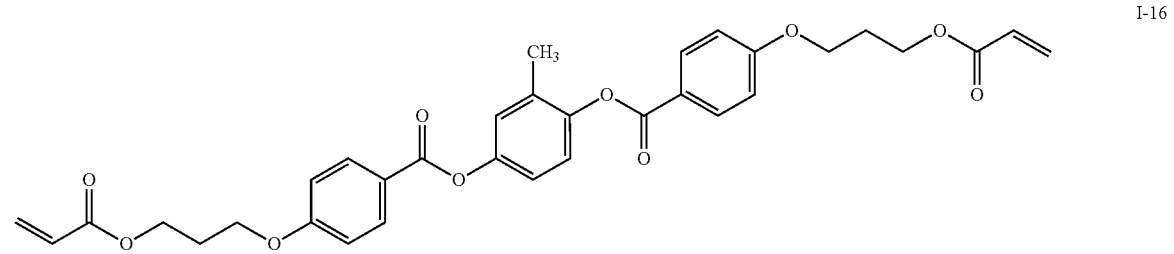
I-17
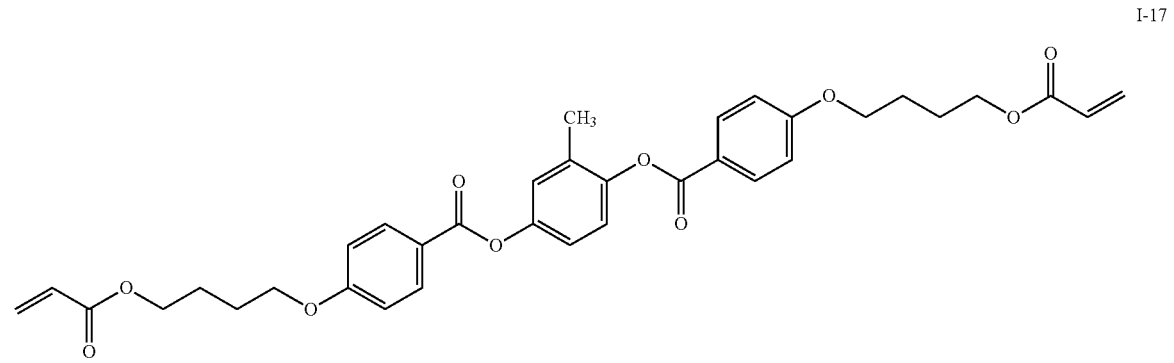

-continued

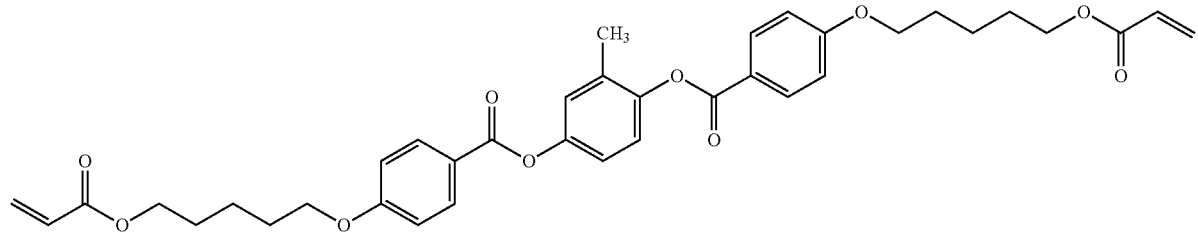

I-18

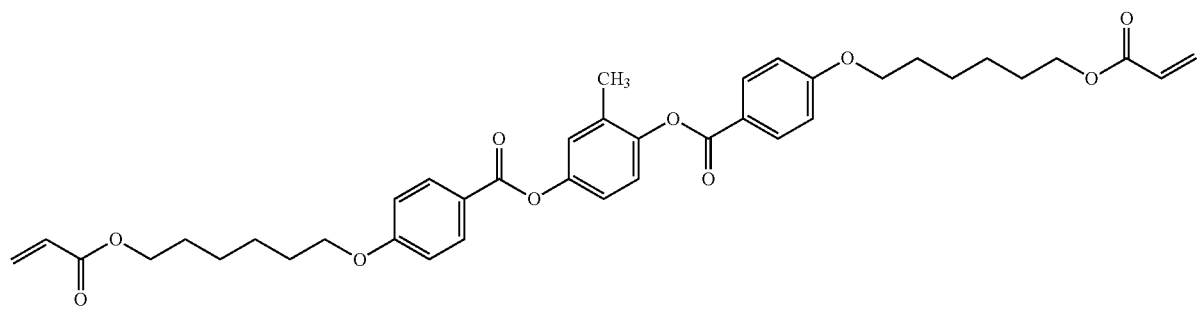

I-19

The rod-shaped liquid crystal compound having two polymerizable groups exemplified above and the rod-shaped liquid crystal compound having one polymerizable group exemplified below are preferably mixed to be used.

In the mixture of a rod-shaped liquid crystal compound having two polymerizable groups and a rod-shaped liquid crystal compound having one polymerizable group, a mixture ratio of the rod-shaped liquid crystal compound having one polymerizable group is preferably 0.1 mass % to 40 mass %, more preferably 1 mass % to 30 mass %, and further preferably 5 mass % to 20 mass % with respect to a total mass of the rod-shaped liquid crystal compound having two polymerizable groups and the rod-shaped liquid crystal compound having one polymerizable group.

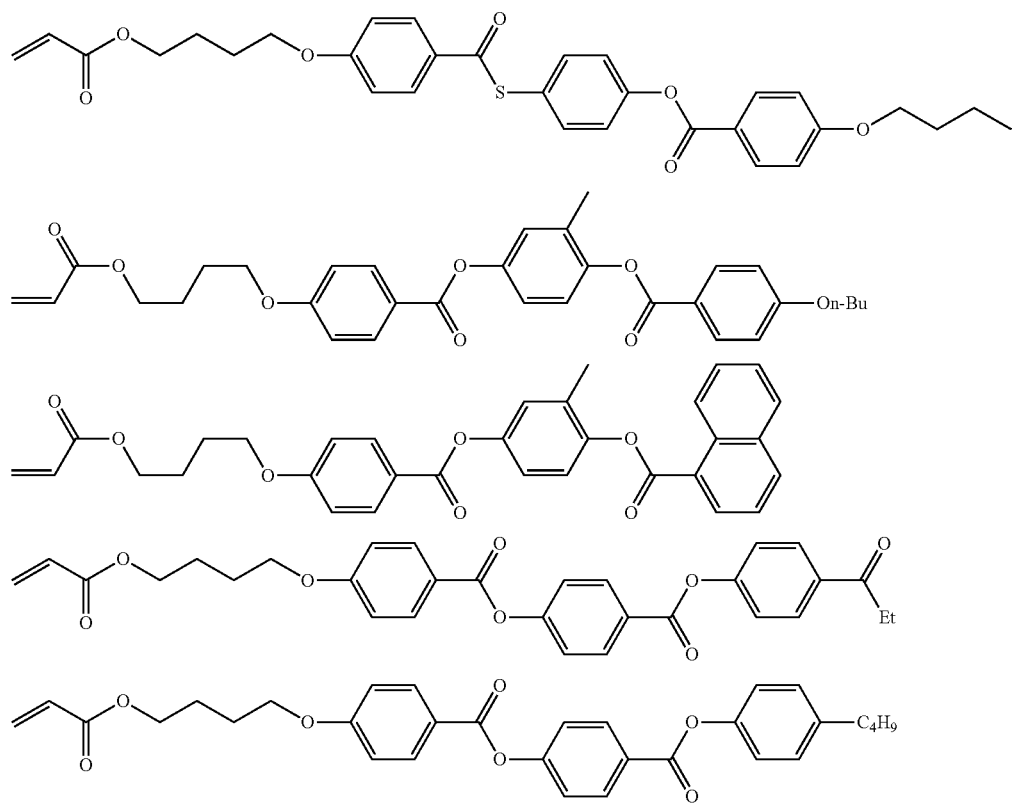

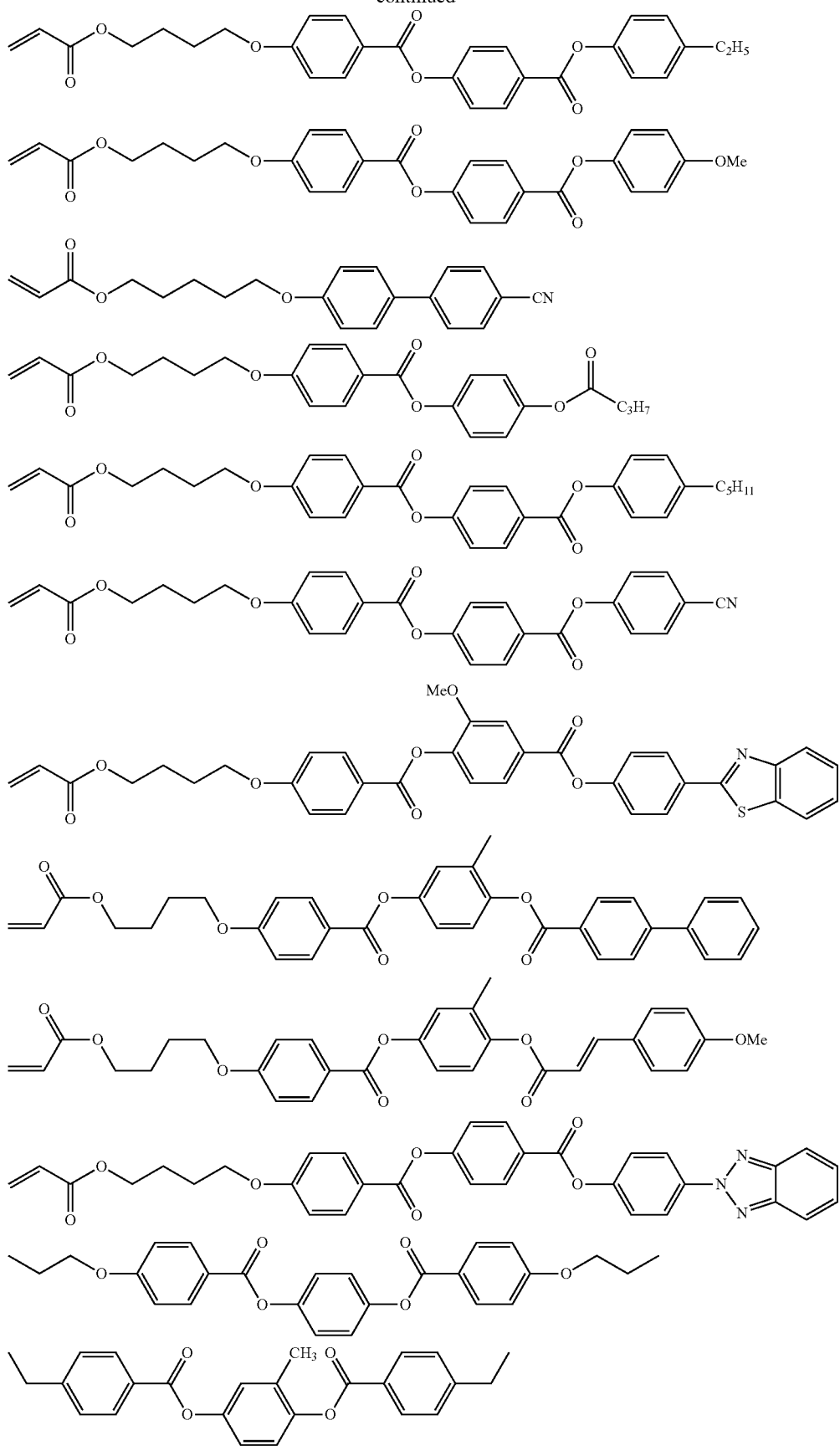

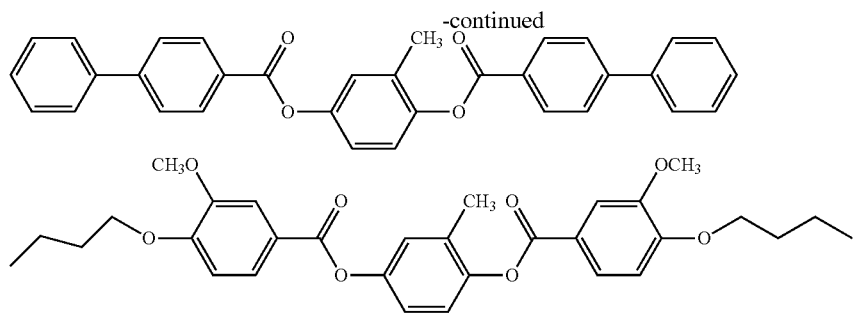

As the liquid crystal compound, a disk-shaped liquid crystal compound can be used. Examples of the disk-shaped liquid crystal compounds include benzene derivatives disclosed the research report by C. Destrade et al., Mol. Cryst. Vol. 71, page 111 (1981); truxene derivatives disclosed in the research report of C. Destrade et al., Mol. Cryst. Vol. 122, page 141 (1985), and Physics Lett, A, Vol. 78, page 82 (1990); cyclohexane derivatives disclosed in the research report of B. Kohne at el., Angew. Chem. Vol. 96, page 70 (1984); and the aza-crown-based and phenyl acetylene-based macrocycles disclosed in the research report of J. M. Lehn et al., J. Chem. Commun., page 1794 (1985), and the research report of J. Zhang et al., J. Am. Chem. Soc., Vol. 116, page 2655 (1994). These disk-shaped liquid crystal compounds generally have a structure with a disk-shaped mother nucleus in the center of the molecule, in which a group such as a linear alkyl group, an alkoxy group, and a substituted benzoyloxy group is radially substituted. The disk-shaped liquid crystal compounds exhibit liquid crystallinity and include those generally referred to as disk-shaped liquid crystal. In a case where an aggregate of such molecules is aligned uniformly, it exhibits negative monoaxial properties. However, the invention is not limited to this description. Examples of disk-shaped liquid crystal compound include the compounds disclosed in paragraphs "0061" to "0075" of JP2008-281989A.

Two or more types of polymerizable liquid crystal compounds may be used in combination. The polymerizable liquid crystal compound is preferably 10 to 60 mass %, more preferably 20 to 50 mass %, and particularly preferably 30 to 40 mass % with respect to a solid content mass (mass excluding solvent) of the liquid crystal composition.

The liquid crystal composition preferably contains a polymerization initiator. In an embodiment in which polymerization reaction due to ultraviolet light irradiation proceeds, the used polymerization initiator is preferably a photopolymerization initiator that can initiate polymerization reaction due to ultraviolet light irradiation. Examples of the photopolymerization initiator include α-carbonyl compounds (disclosed in specifications of U.S. Pat. No. 2,367,661A and U.S. Pat. No. 2,367,670A), acyloin ether (disclosed in specification of U.S. Pat. No. 2,448,828A), an α-hydrocarbon-substituted aromatic acyloin compound (disclosed in specification of U.S. Pat. No. 2,722,512A), a polynuclear quinone compound (disclosed in specifications of U.S. Pat. No. 3,046,127A and U.S. Pat. No. 2,951,758A), a combination of a triarylimidazole dimer and p-amino phenyl ketone (disclosed in specification of U.S. Pat. No. 3,549,367A), acridine and phenazine compounds (disclosed in specifications of JP1985-105667A (JP-S60-105667A) and U.S. Pat. No. 4,239,850A), and an oxadiazole compound (disclosed in specification of U.S. Pat. No. 4,212,970A). A content of the photopolymerization initiator in the liquid crystal composition is preferably 0.1 to 20 mass % and more preferably 0.5 mass % to 5 mass % with respect to the content of the polymerizable liquid crystal compound.

The liquid crystal composition may arbitrarily contain a crosslinking agent for durability improvement and film hardness improvement after hardening. As the crosslinking agent described above, crosslinking agents that allow hardening with ultraviolet light, heat, humidity, and the like can be suitably used. The crosslinking agent is not particularly limited and can be appropriately selected according to the purpose. Examples thereof include a polyfunctional acrylate compound such as trimethylolpropane tri(meth)acrylate and pentaerythritol tri(meth)acrylate; an epoxy compound such as glycidyl (meth)acrylate and ethyleneglycoldiglycidyl ether; an aziridine compound such as 2,2-bis-hydroxymethyl butanol-tris [3-(1-aziridinyl)propionate], and 4,4-bis(ethyleneiminocarbonylamino)diphenylmethane; an isocyanate compound such as hexamethylene diisocyanate and biuret-type isocyanate; and an alkoxysilane compound such as vinyltrimethoxysilane and N-(2-amino ethyl)3-aminopropyltrimethoxysilane. According to reactivity of the crosslinking agent, a catalyst well-known in the related art can be used, and it is possible to improve productivity in addition to the improvement in film hardness and durability. These may be used singly or two or more types thereof may be used in combination. The content of the crosslinking agent is preferably 3 mass % to 20 mass % and more preferably 5 mass % to 15 mass %. If the content of the crosslinking agent is in this range, the effect of the crosslinking density improvement and the stability of the liquid crystal layer can be suitably obtained.

An alignment regulatory agent that causes to stably and promptly obtain a liquid crystal layer with planning machine alignment may be added to the liquid crystal composition. Examples of the alignment regulatory agent include a fluorine-containing (meth)acrylate-based polymer disclosed in "0018" to "0043" of JP2007-272185A and a compound represented by Formulae (I) to (IV) disclosed in paragraphs "0031" to "0034" of JP2012-203237A. One type of the alignment regulatory agent may be used singly or two or more types thereof may be used in combination. An addition amount of the alignment regulatory agent in the liquid crystal composition is preferably 0.01 mass % to 10 mass %, more preferably 0.01 mass % to 5 mass %, and particularly preferably 0.02 mass % to 1 mass % with respect to the total mass of the liquid crystal compound.

The liquid crystal composition may contain at least one type selected from a surfactant for causing a film thickness to be even by adjusting surface tension of a coating film and various additives such as a polymerizable monomer. It is possible to further add a polymerization inhibitor, an antioxidant, an ultraviolet absorbing agent, a light stabilizer, a colorant, metal oxide fine particles, or the like, to the liquid crystal composition, if necessary, in a range of not decreasing optical properties.

With respect to the liquid crystal layer consisting of a polymerizable liquid crystal compound, a liquid crystal layer in which alignment is fixed can be formed by obtaining a coated film by coating a substrate with a liquid crystal composition obtained by dissolving a polymerizable liquid crystal compound and a polymerization initiator, in addition to a surfactant and the like which is further added if necessary, in a solvent and drying the liquid crystal composition and polymerizing the polymerizable liquid crystal compound by irradiating the coated film with active light.

A solvent used for adjusting the liquid crystal composition is not particularly limited, and can be appropriately selected depending on purposes. However, an organic solvent is preferably used. The organic solvent is not particularly limited, and can be appropriately selected depending on purposes. Examples thereof include ketones, alkylhalides, amides, sulfoxides, a heterocyclic ring compound, hydrocarbons, esters, and ethers. The organic solvents may be used singly or two or more types thereof may be used in combination. Among these, in a case where load on the environment is considered, ketones are particularly preferable.

The method for coating the substrate with the liquid crystal composition is not particularly limited, and can be appropriately selected depending on purposes. Examples thereof include a wire bar coating method, a curtain coating method, an extrusion coating method, a direct gravure coating method, a reverse gravure coating method, a die-coating method, a spin coating method, a dip coating method, a spray coating method, and a slide coating method. The liquid crystal molecule is aligned by heating the coated liquid crystal composition. A heating temperature is preferably 200° C. or lower and more preferably 130° C. or lower.

The aligned liquid crystal compound may be further polymerized. Examples of the polymerization method include photopolymerization (ultraviolet light polymerization), radiation polymerization, electron beam polymerization, and thermal polymerization. The polymerization method may be any one of these, but photopolymerization is preferable. The photoirradiation is preferably performed by using ultraviolet light. Irradiation energy is preferably 20 mJ/cm$^2$ to 50 J/cm$^2$ and more preferably 100 mJ/cm$^2$ to 1,500 mJ/cm$^2$. In order to promote photopolymerization reaction, photoirradiation may be performed under a heating condition or in a nitrogen atmosphere. A wavelength of the irradiated ultraviolet light is preferably 200 nm to 430 nm. A polymerization reaction rate is preferably high in view of stability. However, in view of flexibility, a polymerization reaction rate is preferably adjusted to be low. Depending on the necessity, a polymerization reaction rate may be adjusted by adjusting irradiation energy or the like. Generally, the polymerization reaction rate is preferably 60% to 100%, more preferably 70% to 95%, and even more preferably 80% to 90%.

With respect to the polymerization reaction rate, a consumption ratio of a polymerizable functional group can be determined by using IR adsorption spectrum.

The film thickness of the hardened film may be 1 µm to 100 µm, is preferably 1 µm to 50 µm, and more preferably 1 µm to 10 µm.

<Stress Measuring Method>

Specifically, the measurement of stress can be performed in the following order.

A photoelastic product including a measurement subject is irradiated with light penetrating the linear polarizing film and the phase difference film in this order, and reflected light from the product which is derived from the irradiated light penetrating the phase difference film and the linear polarizing film in this order is detected.

The linear polarizing film and the phase difference film that the irradiated light penetrates and the phase difference film and the linear polarizing film that the reflected light penetrates may be identical to each other, respectively (for example, FIG. 1) or may be different from each other, but are preferably identical to each other.

In a case where the measurement subject is a product without photoelasticity, the above procedures are performed by preparing the photoelastic product by adhering the stress displaying member including the stress displaying member including the photoelastic layer in this order to the surface of the measurement subject such that the reflection layer is on the measurement subject side.

In a case where the surface of the measurement subject does not have light reflectivity, it is preferable to use the stress displaying member including the photoelastic layer and the reflection layer in this order. At this point, the stress displaying member is adhered to the surface of the measurement subject, such that the reflection layer is on the measurement subject side. The stress displaying member is described below.

A schematic diagram of the arrangement of the respective layers and a relationship between the light incident direction and the observation direction are illustrated in FIG. 1, in a case where the stress of the measurement subject is measured by using the stress displaying member including the photoelastic layer and the reflection layer at the same time.

In this specification, the stress measurement target is referred to as a measurement subject. In the stress measuring method, there is a case where a product obtained by adhering the stress displaying member or the stress measuring member to the surface of the measurement subject becomes a measurement target as a photoelastic product. The material of the measurement subject is not particularly limited, but examples thereof include metal, concrete, ceramics, glass, rubber, plastics, paper, and fibers, and may be a transparent body or an opaque body. The measurement subject may or may not have photoelasticity on the surface. In a case where the measurement subject has photoelasticity on the surface, it is possible to measure stress without adhering the photoelastic layer to the surface from the outside. The surface of the measurement subject may have light reflecting properties or may not have light reflecting properties. In a case where the surface has light reflecting properties, it is possible to measure stress without adhering the reflection layer to the surface from the outside.

The surface to which the stress displaying member of the measurement subject is adhered may be a plane surface or may have unevenness.

The irradiated light is preferably white light, since a change of a color is easily identified. That is, the light source used in the stress measuring method is preferably a white light source. Here, the white light source is a light source including light in a wavelength of 400 nm to 700 nm, and examples thereof include sunlight, an incandescent lamp, a fluorescent lamp, LED, a mercury lamp, and a halogen lamp.

The light may be detected visually or by using a device such as a photodetector or a digital camera. In a case where a device is used, measuring can be performed at high accuracy by performing recording and analyzing the measured image with a computer. Spectral analysis is performed on the detected light by using a spectrophotometer, so as to perform measurement at much higher accuracy.

The color of the detected light is required to be measured in a constant angle since there is angle dependency, and it is preferable to perform measurement in a vertical direction with respect to the measurement surface. If the light that does not penetrate the linear polarizing layer and the phase difference layer is reflected on the photoelastic layer or the reflection layer, there is influence on the measured color. Therefore, distances between the photoelastic layer (measurement subject in a case where measurement subject is photoelastic), a phase difference layer, and a linear polarizing layer are preferably close, and the phase difference layer and the linear polarizing layer preferably adhere to each other. The phase difference layer and the photoelastic layer may adhere to each other. If the phase difference layer and the photoelastic layer adhere to each other, distortion occurs in the phase difference due to distortion of the measuring object and thus the phase difference amount changes, so there is a case where a measurement error occurs. However, if the phase difference layer and the photoelastic layer adhere with an adhesive or a gluing agent which has a sufficiently small modulus of elasticity, the measurement error can be caused to be small.

At the time of stress measurement, it is possible to reduce angle dependency of a color of the detected light by restricting a view angle by using a measurement view angle restricting film (prism film, louver film, or the like). A view angle restricting film may be used by arranging a single sheet on the measurement subject, the stress displaying member, or a surface of the linear polarizing film, may be a layer configuring the stress displaying member by being laminated on the outermost surface of the stress displaying member on the view side, and may be a layer configuring the stress measuring member by being laminated on the outermost surface of the linear polarizing film on the view side.

The stress measuring method preferably has a distortion amount of 0.00001 or greater as a target. The upper limit of the distortion amount as the target is not particularly limited, but the upper limit is about 0.3.

With respect to the stress measuring method, it is possible to visually evaluate a distortion amount of the measurement subject in the slow axis direction of the phase difference layer by preparing a correspondence table of colors of the detected light and stress amounts (distortion amounts) in advance. As changes (color difference) of the detected light are greater, identification becomes easier. Therefore, as the color difference in the predetermined stress amounts (distortion amounts) greater, highly sensitive measurement can be performed. A stress can be calculated by evaluating changes (color difference) of colors of the light detected by digital camera or the like. That is, it is possible to calculate stress from a change of a color based on a relationship expression between stress and changes of colors prepared in advance. With respect to a calculation method, disclosure of "0011" to "0014" of JP1993-79927A (JP-H05-79927A) can be referred to. In a case where spectral analysis is performed by using a spectrophotometer, highly accurate measurement can be performed, for example, by evaluating a shift amount of a reflection wavelength peak of detected light.

Changes of a color can be quantified, for example, by color differences in a CIE 1976 (L*a*b*) color system. The CIE 1976 (L*a*b*) color system is one of an equal color space determined by CIE in 1976. In the CIE 1976 (L*a*b*) color system, lightness is represented by L*, and saturation is represented by $(a^{*2}+b^{*2})^{1/2}$. A color difference in the CIE 1976 (L*a*b*) color system is a color difference represented by $\Delta E_{ab}^*$ in a color space having an amount L*a*b* determined in the following expression in an orthogonal coordinate system. (See Coloring Materials Engineering Handbook published on Nov. 25, 1989, 2.8. "Color", pages 190 to 211)

$$L^*=116(Y/Y_0)^{1/3}-16 a^*=500[(X/X_0)^{1/3}-(Y/Y_0)^{1/3}]$$

$$b^*=200[(Y/Y_0)^{1/3}-(Z/Z_0)^{1/3}]$$

(However, $X/X_0$, $Y/Y_0$, $Z/Z_0$>0.008856, X, Y, and Z are tristimulus values of an object color, and $X_0$, $Y_0$, and $Z_0$ are tristimulus values of a light source that illuminates an object color and are standardized to $Y_0$=100.)

With respect to a color difference of two object colors disposed under certain illumination, a color difference $\Delta E_{ab}^*$ is calculated in the following expression, by obtaining $L_1^*$, $a_1^*$, $b_1^*$, $L_2^*$, $a_2^*$, and $b_2^*$ by the above expression from respective tristimulus values $X_1$, $Y_1$, $Z_1$, $X_2$, $Y_2$, and $Z_2$ and using these.

$$\Delta E_{ab}^*=\{(L_1^*-L_2^*)^2+(a_1^*-a_2^*)^2+(b_1^*-b_2^*)^2\}^{1/2}$$

In practice, a color difference of two object colors is measured by using a color difference meter. As such a measuring device, for example, a color analysis device C-2000 type (color analyzer) manufactured by Yamato Scientific Co., Ltd., or the like can be used.

<Stress Measuring Member>

In this specification, the stress measuring member means a member used for measuring stress (distortion). Typically, the stress measuring member is a member for converting stress occurring in the measurement subject in a form of being optically detected from the outside. The detection may be visually performed or may be performed by using a measuring device or the like.

The stress measuring member may further require a stress displaying member for measuring stress or may also serve as a stress displaying member.

The stress measuring member preferably has a film shape or a sheet shape.

In a case where the stress measuring member is adhered to the measurement subject to be used, the film thickness may be 1 μm to 1,000 μm, preferably 5 μm to 500 μm, and more preferably 10 μm to 300 μm.

In a case where the stress measuring member includes a stress displaying member, the film thickness may be 10 μm to 5,000 μm, preferably 20 μm to 2,000 μm, and more preferably 50 μm to 1,000 μm.

In a case where the stress measuring member does not include the stress displaying member and does not adhered to the measurement subject to be used, the film thickness may be 1 μm to 2,000 μm, preferably 5 μm to 1,000 μm, and more preferably 10 μm to 500 μm.

Figures 2, 3:
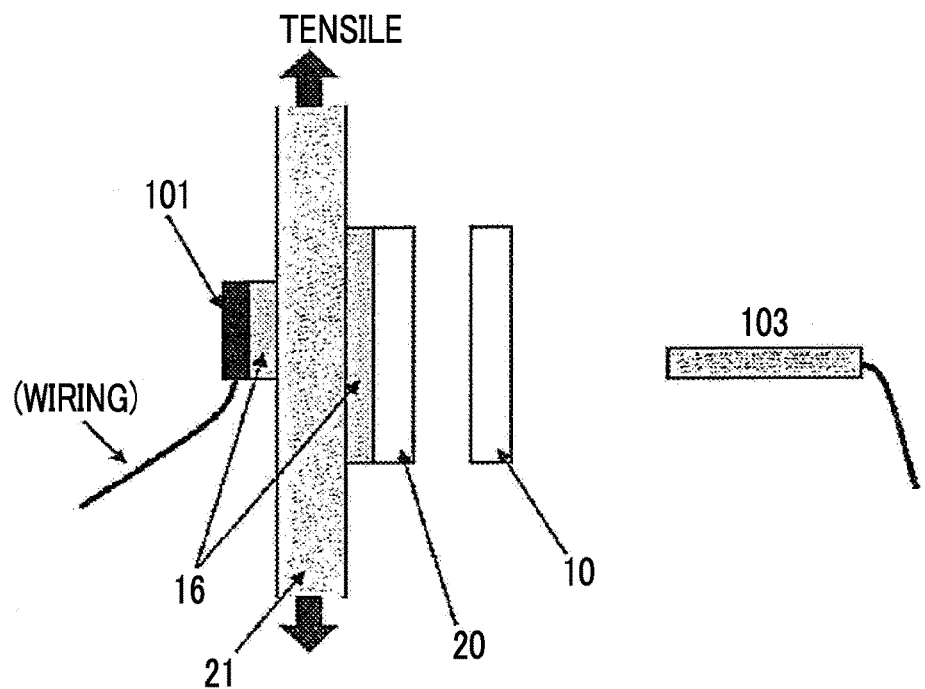
FIG. 2 is a diagram illustrating a configuration example (schematic cross-sectional view) of a stress displaying member.
FIG. 3 is a diagram schematically illustrating arrangement of respective members in measurement performed in an example.

The stress measuring member includes the phase difference layer (phase difference film). It is preferable that the stress measuring member further includes the linear polarizing layer. In addition to the phase difference layer and the linear polarizing layer, the stress measuring member may include a support body, an alignment layer, an antireflection layer, an antiglare layer, or an adhesion layer, and the like, if necessary. As described above, the stress measuring member may include a configuration corresponding to the stress displaying member. An example of the layer configuration that can be taken by the stress measuring member according to the invention is shown in FIG. 2.

<Linear Polarizing Layer (Linear Polarizing Film)>

The linear polarizing film used in the stress measuring method or the linear polarizing layer of the stress measuring member is not particularly limited, and those well-known in the related art can be used. Examples of the linear polarizing layer include an iodine-based polarizer, a dye-based polarizer, and a wire grid-type linear polarizer.

An iodine-based polarizer and a dye-based polarizer are films that can be obtained by performing absorb alignment on iodine or a dye in modified or native polyvinyl alcohol.

A wire grid-type polarizer is a polarizer that a portion of polarized light penetrates and that reflects the other by birefringence of metal fine wire. The wire grid polarizer is a polarizer in which metal wire is periodically arranged and is mainly used as a polarizer in a terahertz wave band. In order to cause the wire grid to function as a polarizer, it is required that a wire interval is sufficiently smaller than a wavelength of incident electromagnetic waves. In the wire grid polarizer, metal wire is arranged in an equal interval. A polarization component in a polarization direction parallel to a longitudinal direction of metal wire is reflected on the wire grid polarizer, and a polarization component in a polarization direction vertical to a longitudinal direction penetrates the wire grid polarizer. As the wire grid-type polarizer, a commercially available product can be used. Examples of the commercially available product include a wire grid polarization filter 50×50, NT46-636 manufactured by Edmund Optics Inc., TLP43 manufactured by MeCan Imaging, Inc. and the like.

The film thickness of the linear polarizing layer may be 0.05 μm to 1,000 μm, particularly 500 μm or less, preferably 300 μm or less, and more preferably 200 μm or less.

It is preferable to suppress the reflection on an interface of phase difference layer by using a stress measuring member having a structure in which the phase difference layer and the linear polarizing layer adhere to each other with an adhesive or the like. In the adhesive at this point, it is preferable to use an acrylic optical transparent adhesive referred to as a so-called optically clear adhesive (OCA) or an optically clear resin (OCR).

[Support Body]

The stress measuring member may include a support body. On the surface of the support body, an easily adhesive layer, an antistatic layer, a solvent resistant layer, an alignment layer, a scratch resistant layer, an antireflection layer, an ultraviolet light (UV) absorbing layer, a gas barrier layer, a transparent conductive layer, an adhesive layer, a plasma surface treated layer, and the like may be laminated.

The film thickness of the support body may be about 5 μm to 1,000 μm, preferably 10 μm to 250 μm, and more preferably 15 μm to 90 μm.

In a case where the phase difference layer is a hardened film of a liquid crystal composition, a support body is generally used for coating of the liquid crystal composition or the like. The support body at this point may be peeled off from the stress measuring member. That is, for example, the phase difference layer formed on the support body may be transferred to the linear polarizing layer. In the step including transferring, characteristics of heat resistance of the support body can be selected appropriate for the manufacturing of the phase difference layer, and also optical properties of the stress displaying member or the like can be caused not to be influenced by the characteristics of the support body. It is preferable that the support body in a case where the support body becomes a portion of the stress measuring member is optically isotropic and has a small phase difference. Examples thereof include films of various polymers such as triacetyl cellulose, a cycloolefin polymer, a cycloolefin copolymer, polymethyl methacrylate, polycarbonate, glycol modified polyethylene terephthalate (PETG). Meanwhile, in a case where the support body does not become a portion of the stress measuring member, films of various polymers such as polyethylene terephthalate (PET), polyimide, polyethylene naphthalate, polyethylene, polypropylene, polyvinyl chloride can be also used as the support body.

[Alignment Layer]

The stress measuring member may include an alignment layer for aligning the liquid crystal compound at the time of manufacturing the phase difference layer. The alignment layer can be provided by means of a rubbing treatment of an organic compound or a polymer (a resin such as polyimide, polyvinyl alcohol, polyester, polyarylate, polyamideimide, polyetherimide, polyamide, and modified polyamide), an oblique vapor deposition of an inorganic compound, formation of a layer having microgrooves, and accumulation of an organic compound (for example, ω-tricosanoic acid, dioctadecylmethylammonium chloride, and methyl stearate) by a Langmuir-Blodgett method (LB film). An alignment layer in which an alignment function is generated by providing an electric field, providing a magnetic field, or photoirradiation is known. Among these, an alignment layer formed by a rubbing treatment of a polymer is particularly preferable. The rubbing treatment can be performed by rubbing the surface of the polymer layer with paper or cloth, several times in a constant direction.

The thickness of the alignment layer is preferably 0.01 to 5 μm and more preferably 0.05 to 2 μm.

The support body surface or a surface of the support body subjected to the rubbing treatment may be coated with the liquid crystal composition without providing an alignment layer.

[Antireflection Layer or Antiglare Layer]

In the stress measuring member, it is preferable that the antireflection layer or the antiglare layer is laminated on the surface of the linear polarizing layer, such that reflected light on a surface of the linear polarizing layer does not obstruct measuring. The antiglare layer can be allowed to have an antiglare effect by roughening a surface and scattering reflected light in a visible light region by an uneven structure. A layer having fine unevenness formed on the surface can be applied by forming a layer in which a roughening treatment is performed on the surface, by an appropriate method such as sandblasting, embossing rolling, and chemical etching, a layer on which a fine uneven structure is applied by a transferring method by molding, and a resin layer containing particles in a dispersed manner. Particularly, in a case of a resin layer containing particles in a dispersed manner, it is possible to adjust a degree of antiglare by controlling a particle size and particle density.

With respect to the antireflection layer, a layer that allows to obtain an antireflection effect on the light in a wider wavelength range, an antireflection layer in which fine uneven patterns in which a cycle of unevenness is restricted to be equal to or less than a wavelength of the visible light are formed on the surface, and the like can be applied, by forming an antireflection layer efficient to light having a single wavelength by forming a thin film consisting of a material of a low refractive index as a single layer on the surface or plural layers in which thin films of low refractive index materials and high refractive index materials are alternatively formed.

[Stress Displaying Member]

In this specification, the stress displaying member means a member that can indicate stress (distortion) occurs by itself in a form of capable of being detected from the outside. At the time of stress measuring, the stress measuring member can be combined with the stress displaying member to be used as a stress measuring set. Otherwise, the stress measuring member may include the stress displaying member.

The stress displaying member includes the photoelastic layer. The stress displaying member preferably includes the reflection layer. The stress displaying member may include other layers such as a light shield layer or an adhesion layer, in addition to the photoelastic layer and the reflection layer.

[Photoelastic Layer]

The photoelastic layer preferably has an absolute value of a great photoelastic coefficient. This is because an absolute value of the photoelastic coefficient influences on the detection sensitivity of the stress (distortion). Great birefringence (phase difference) can occur with small stress by using a birefringence layer having a great absolute value of a photoelastic coefficient, and thus sensitivity for detecting and measuring the stress can be increased. The absolute value of the photoelastic coefficient of the birefringence layer is preferably $20 \times 10^{-12}$ [$Pa^{-1}$] or greater. The fact that the absolute value of the photoelastic coefficient is $20 \times 10^{-12}$ [$Pa^{-1}$] or greater means that the photoelastic coefficient is $20 \times 10^{-12}$ $Pa^{-1}$ or greater or $-20 \times 10^{-12}$ $Pa^{-1}$ or less. Since the photoelastic layer is preferably thin, the absolute value of the photoelastic coefficient is more preferably $30 \times 10^{-12}$ [$Pa^{-1}$] or greater and even more preferably $60 \times 10^{-12}$ [$Pa^{-1}$] or greater, in order to cause the phase difference to be great. The upper limit of the absolute value of the photoelastic coefficient of the birefringence layer is not particularly limited, but may be $1 \times 10^{-6}$ [$Pa^{-1}$] or less. The fact that the absolute value of the photoelastic coefficient is $1 \times 10^{-6}$ [$Pa^{-1}$] or less means that the photoelastic coefficient is $-1 \times 10^{-6}$ $Pa^{-1}$ to $1 \times 10^{-6}$ $Pa^{-}$.

The photoelastic layer preferably has high visible light transmittance, and the visible light transmittance is preferably 50% or greater, 70% or greater, 90% or greater, and 99% or greater.

The photoelastic layer preferably indicates retardation satisfying Re (450)/Re (550)≥0.90. If the photoelastic layer has the optical properties, the change of the color can be greatly observed. The photoelastic layer more preferably indicates retardation satisfying Re (450)/Re (550)≥1.00, and even more preferably indicates retardation satisfying Re (450)/Re (550)≥1.05. The Re (450)/Re (550) of the photoelastic layer may be 1.5 or less. For example, values of Re (450)/Re (550)=1, Re (450)/Re (550)=1.07, Re (450)/Re (550)=1.12, and the like are suitable.

The retardation before adhering the measurement subject of the photoelastic layer is preferably Re (550)≤30 nm, more preferably Re (550)≤20 nm, and even more preferably Re (550)≤10 nm. If the residual stress of the photoelastic layer itself is great, anisotropy becomes great due to retardation on the photoelastic layer before distortion occurs in the measurement subject. Therefore, a color change in the direction in which the photoelastic layer adheres to the measurement subject becomes greatly different, and thus the residual stress of the photoelastic layer preferably is small.

The photoelastic layer preferably includes an aromatic compound. As a material for forming the photoelastic layer, for example, an aromatic polymer is preferable. The aromatic polymer means a polymer including an aromatic group in a repeating unit structure, and the aromatic polymer includes a crosslinked product obtained by polymerizing a monomer of an aromatic compound by photopolymerization (ultraviolet light polymerization), radiation polymerization, electron beam polymerization, thermal polymerization, and the like. Specific examples of a material for forming a photoelastic layer include aromatic polycarbonate, an epoxy resin, polyimide, polycarbonate, polyethylene naphthalate, polyethylene terephthalate, glycol-modified polyethylene terephthalate (PETG), polyamide, polyvinyl alcohol, triacetyl cellulose, polystyrene, and polymethyl methacrylate. The aromatic polymer has great refractive index anisotropy in a molecule by π electrons and a great photoelastic coefficient, great birefringence occurs with small stress such that measuring sensitivity can be increased. Particularly, aromatic polycarbonate allows a film to be manufactured in an industrial scale by a solution casting method, and thus highly accurate measuring can be performed by a film having a uniform film thickness and thus small residual stress.

Meanwhile, in the polymer material, retardation changes due to stress relaxation with time. However, a measurement error due to stress relaxation with time can be suppressed in the stress measuring for a long period of time by using a compound having a three-dimensional mesh structure by crosslinking in the photoelastic layer.

If influence of stiffness of the photoelastic layer on the distortion of the measurement subject and followability of the measurement subject to the surface shape are considered, the film thickness of the photoelastic material is preferably 1 mm or less, more preferably 500 μm or less, and even more preferably 300 μm or less. Particularly, a film having a thickness of 0.5 mm or less can make a roll shape, and thus it is possible to use a film of a photoelastic material that can be inexpensively manufactured. Meanwhile, as the film thickness becomes thinner, the retardation becomes smaller, and thus measuring sensitivity becomes lower. Therefore, the film thickness is preferably 10 μm or greater, more preferably 30 μm or greater, and even more preferably 50 μm or greater.

[Reflection Layer]

The stress displaying member may include the reflection layer. The reflection layer can be provided by laminating a material including metal such as aluminum, silver, chromium, and titanium on the photoelastic layer by vapor deposition, plating, coating, co-extrusion, and extrusion lamination. In a case where a stress displaying member is a portion of the stress measuring member, the reflection layer may be provided on the opposite side of the phase difference layer, seen from the photoelastic layer.

[Adhesion Layer and Adhesive]

The stress displaying member preferably has an adhesion layer to be a form capable of being used for measuring stress by being attached to the measurement subject. This adhesion layer is preferably an outermost layer seen from all of the photoelastic layer, the reflection layer, and the like, according to the functions above. However, before adhesion to the measurement subject, a releasable paper (film) for protecting an adhesion layer may be provided on an outer side of the adhesion layer.

Examples of the adhesion layer include layers formed with thermosetting adhesives such as a cyanoacrylate-based adhesive, an epoxy-based adhesive, a chloroprene rubber-based adhesive, a polyester-based adhesive, a phenol-based adhesive, a urethane-based adhesive, and a melamine-based adhesive. These adhesives are preferable in view of reducing influence on stress measuring accuracy by a creep phenomenon of an adhesion layer. If a support body is provided between the photoelastic layer and the measurement subject, the support body becomes a stress relaxation layer, to be a cause of an error of the stress measurement. Therefore, it is preferable that the adhesion layer is directly laminated on the surface of the photoelastic layer to be adhered to the measurement subject, in view of measuring accuracy. However, in a case where the stress displaying member has the reflection layer, it is preferable to arrange a reflection layer between the photoelastic layer and the adhesion layer.

It is possible to cause the stress displaying member to easily follow the distortion of the measurement subject by peeling off the support body after the stress displaying member is adhered to the measurement subject and causing the stiffness of the stress displaying member to be small.

The stress displaying member may not have the adhesion layer, and an adhesive may be separately prepared when the stress displaying member is attached to the measurement subject. At this point, various adhesives can be used in addition to the same adhesive at the time of forming the adhesion layer. However, in order to avoid deterioration of workability in a case of being adhered to the measurement subject in a large area or deterioration of the measuring accuracy due to generation of wrinkle or breakage in the stress displaying member at the time of application, it is preferable to laminate the adhesion layer on the stress displaying member in advance. If the releasable paper (film) is also laminated on the adhesion layer, workability becomes satisfactory by peeling off the releasable paper (film) right before adherence to the measurement subject. If the adhesion layer in which microcapsulated hardener is dispersed in a main agent of the adhesive is laminated, adhesiveness is not exhibited until the stress displaying member is adhered to the measurement subject, and adhesiveness can be exhibited by breaking microcapsules by pressing the microcapsules with a finger or the like after being adhered.

[Adhesion Layer for Adherence of Respective Layers]

Examples of the adhesive for adherence of respective layers in the stress displaying member include a hot melt type, a thermosetting type, a photocuring type, a reaction hardening type, and a pressure sensitive adhesion type that does not require hardening. As respective materials, acrylate-based, urethane-based, urethaneacrylate-based, epoxy-based, epoxy acrylate-based, polyolefin-based, modified olefin-based, polypropylene-based, ethylenevinyl alcohol-based, vinyl chloride-based, chloroprene rubber-based, cyanoacrylate-based, polyamide-based, polyimide-based, polystyrene-based, and polyvinyl butyral-based compounds, or the like can be used. In view of workability and productivity, a photocuring type is preferable as a hardening type. In view of optical transparency and heat resistance, acrylate-based, urethaneacrylate-based, epoxy acrylate-based compounds, or the like are preferably used as the material. Particularly preferable examples thereof include optically transparent acrylic adhesives referred to as a so-called optically clear adhesive (OCA) or an optically clear resin (OCR).

The film thickness of the adhesion layer for adherence of the respective layers is specifically 0.1 µm to 1,000 µm, preferably 0.5 µm to 500 µm, and more preferably 1 µm to 300 µm.

It is considered that, in a case where the stress measuring member includes the stress displaying member, distortion occurs in the phase difference layer by distortion of the measurement subject, and retardation changes, so as to be a cause of measurement error. Therefore, it is preferable that an optically isotropic layer having high visible light transmittance, a sufficiently small vertical elastic coefficient, and a thick film thickness exists between the phase difference layer and the photoelastic layer. As a layer having a sufficiently small vertical elastic coefficient and a thick film thickness, an adhesion layer is preferably used.

Examples of the adhesion layer include optically transparent acrylic adhesives referred to as a so-called optically clear adhesive (OCA) or an optically clear resin (OCR). The film thickness of the adhesion layer is specifically 1 µm to 1,000 µm, preferably 10 µm to 500 µm, and more preferably 50 µm to 300 µm.

EXAMPLES

Hereinafter, the invention is described in detail with reference to examples. Materials, reagents, material amounts, and ratios thereof, operations, or the like shown in the examples below can be appropriately changed without departing from the gist of the invention. Accordingly, the scope of the invention is not limited to the examples below.

As stress measuring members, films obtained by adhering phase difference layers of examples and comparative examples prepared as described above to linear polarizing filters such that an angle formed by a slow axis of a phase difference layer to an absorption axis of a linear polarizing filter (TLP43 manufactured by MeCan Imaging, Inc., thickness: 190 µm) becomes 45° with adhesive (MCS70 manufactured by MeCan Imaging, Inc., thickness: 25 µm) were used. Retardation of the phase difference layers was measured by a polarization phase difference analyzer (AXOSCAN manufactured by AXOMETRICS, Inc.).

As stress displaying members, films obtained by vapor depositing aluminum in a thickness of 60 nm were used as reflection layers on surfaces of photoelastic layers by using aromatic polycarbonate resin films (PUREACE C110-100 manufactured by Teijin Limited.) having a thickness of 100 µm manufactured by a solution casting method on the photoelastic layers. A value obtained by measuring a photoelastic coefficient of the photoelastic layer with a phase difference measuring device (ELLIPSOMETER M-220 manufactured by Jasco Corporation) was $97 \times 10^{-12}$ [$Pa^{-1}$], and retardation of the photoelastic layer was measured with a polarization phase difference analyzer (AXOSCAN manufactured by AXOMETRICS, Inc.) and was Re (450)/Re (550)=1.09 and Re (550)=8 [nm].

An aluminum plate having a thickness of 1 mm, a width of 20 mm, and a length of 150 mm was used as the measurement subject, the stress displaying member was cut into a size of 20 mm×20 mm, a surface on an aluminum side was adhered to the center of the measurement subject with an epoxy resin adhesive (EP-34B manufactured by Kyowa Electronic Instruments Co., Ltd.). The thickness of the adhesion layer was 30 µm. A distortion gauge (KFG manufactured by Kyowa Electronic Instruments Co., Ltd.) was adhered to the opposite side of the surface to which the photoelastic layer of the measurement subject was adhered with an epoxy resin adhesive (EP-34B manufactured by Kyowa Electronic Instruments Co., Ltd.), and the distortion amount of a measurement portion of the measurement subject was measured. A schematic diagram of arrangement of respective members at the time of measurement is illustrated in FIG. 3.

Tensile stress was applied to 100 mm of a test length (distance between heads) of the measurement subject at the speed of 0.5 mm/min, with a temperature and humidity of 23° C. and 50% RH, and a tension tester (UTM-500 manufactured by Orientec Co., Ltd.). The measurement was performed at the point when the distortion amounts of the measuring portion were 0.0005 and 0.001.

At this point, arrangement was performed such that the surface of the stress measuring member on the phase difference layer side faces the photoelastic layer side of the stress displaying member, and the slow axis of the phase difference layer becomes parallel to the tensile direction of the tension tester, spectral analysis measurement was performed by a reflective type spectroscope device (USB2000+ manufactured by Ocean Optics) with respect to the stress measuring member from the vertical direction, and a color difference with respect to the color before stretching was measured from evaluation results of L*, a*, and b* in the CIE 1976 (L*a*b*) color system.

The results are shown in Table 1.

Example 1

A cycloolefin polymer film (manufactured by JSR Corporation, ARTON, thickness: 36 μm) was used as a phase difference layer.

Example 2

A layer obtained by laminating four sheets of cycloolefin polymer films (manufactured by JSR Corporation, ARTON, thickness: 36 μm) by using adhesives (MCS70 manufactured by MeCan Imaging, Inc., thickness: 25 μm) such that the slow axes coincide was used as a phase difference layer.

Example 3

A layer obtained by laminating five sheets of cycloolefin polymer films (manufactured by JSR Corporation, ARTON, thickness: 36 μm) by using adhesives (MCS70 manufactured by MeCan Imaging, Inc., thickness: 25 μm) such that the slow axes coincide was used as a phase difference layer.

Example 4

A layer obtained by laminating three sheets of polycarbonate films (manufactured by Teijin Limited., PANLITE PC-2151, thickness: 195 μm) by using adhesives (MCS70 manufactured by MeCan Imaging, Inc., thickness: 25 μm) such that the slow axes coincide was used as a phase difference layer.

Example 5

A polycarbonate film (manufactured by Teijin Limited., PUREACE T-138, thickness: 71 μm) was used as a phase difference layer.

Example 6

A layer obtained by laminating two sheets of polycarbonate films (manufactured by Teijin Limited., PUREACE T-138, thickness: 71 μm) and one sheet of polycarbonate film (manufactured by Teijin Limited., PANLITE PC-2151, thickness: 195 μm) by using adhesives (MCS70 manufactured by MeCan Imaging, Inc., thickness: 25 μm) such that the slow axes coincide was used as a phase difference layer.

Example 7

A layer obtained by laminating two sheets of polycarbonate films (manufactured by Teijin Limited., PUREACE T-138, thickness: 71 μm) and two sheets of polycarbonate films (manufactured by Teijin Limited., PANLITE PC-2151, thickness: 195 μm) by using adhesives (MCS70 manufactured by MeCan Imaging, Inc., thickness: 25 μm) such that the slow axes coincide was used as a phase difference layer.

Example 8

A polycarbonate film (manufactured by manufactured by Kaneka Corporation, R40-#435, thickness: 61 μm) was used as a phase difference layer.

Example 9

A layer obtained by laminating three sheets of polycarbonate film (manufactured by Teijin Limited., PUREACE T-138, thickness: 71 μm) by using adhesives (MCS70 manufactured by MeCan Imaging, Inc., thickness: 25 μm) such that the slow axes coincide was used as a phase difference layer.

Example 10

A layer obtained by laminating one sheet of polycarbonate film (manufactured by Kaneka Corporation, R40-#435, thickness: 61 μm) and one sheet of polycarbonate film (manufactured by Teijin Limited., PANLITE PC-2151, thickness: 195 μm) by using adhesives (MCS70 manufactured by MeCan Imaging, Inc., thickness: 25 μm) such that the slow axes coincide was used as a phase difference layer.

Example 11

A layer obtained by laminating one sheet of polycarbonate film (manufactured by Kaneka Corporation, R40-#435, thickness: 61 μm) and two sheets of polycarbonate films (manufactured by Teijin Limited., PANLITE PC-2151, thickness: 195 μm) by using adhesives (MCS70 manufactured by MeCan Imaging, Inc., thickness: 25 μm) such that the slow axes coincide was used as a phase difference layer.

Example 12

A layer obtained by laminating one sheet of polycarbonate film (manufactured by Kaneka Corporation, R40-#435, thickness: 61 μm) and three sheets of polycarbonate films (manufactured by Teijin Limited., PANLITE PC-2151, thickness: 195 μm) by using adhesives (MCS70 manufactured by MeCan Imaging, Inc., thickness: 25 μm) such that the slow axes coincide was used as a phase difference layer.

Example 13

A polycarbonate film (manufactured by Kaneka Corporation, R40-4570, thickness: 58 μm) was used as a phase difference layer.

Examples 14 to 16

Phase difference layers were manufactured by aligning compounds consisting of compositions described below in one direction and hardening the compounds by UV irradiation.

| | |
|---|---:|
| Compound 1 described below | 70.9 parts by mass |
| Compound 2 described below | 17.7 parts by mass |
| Polymerization initiator IRGACURE 819 (manufactured by BASF SE) | 11.1 parts by mass |
| Fluorine-based horizontal alignment agent 1 described below | 0.3 parts by mass |
| Methyl ethyl ketone | 178 parts by mass |

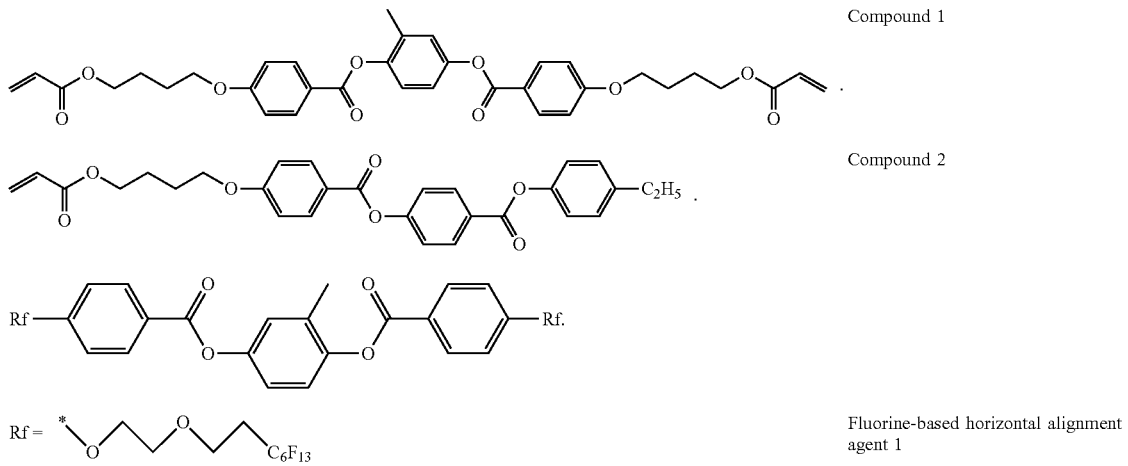

A PET film (without undercoat layer, manufactured by Fujifilm Corporation, thickness: 50 μm, Size: 210 mm×300 mm) was used as a substrate so as to perform a rubbing treatment (rayon cloth, pressure: 0.98 N, rotation speed: 1,000 rpm, transportation speed: 10 m/min, number of times: 1 back and forth) was performed on the surface of a PET film.

A substrate was coated with the liquid crystal composition prepared as described above by using a wire bar at room temperature. The liquid crystal composition was dried for 30 seconds at room temperature so as to remove methyl ethyl ketone, and heating was performed for one minute in an atmosphere of 90° C. Subsequently, a liquid crystalline phase was fixed with UV irradiation of 500 mJ/cm$^2$, so as to prepare a phase difference layer. Due to the difference of coating amount of the liquid crystal composition, the film thicknesses of the phase difference layers after forming were 1.5 μm in Example 14, 3.7 μm in Example 15, and 4.3 μm in Example 16.

A phase difference layer was laminated on the linear polarizing layer by using an adhesive (MCS70 manufactured by MeCan Imaging, Inc., thickness: 25 μm), so as to remove the PET film of the substrate by peeling.

Comparative Example 1

Only a linear polarizing filter was used without using a phase difference layer, and the linear polarizing filter and the tension tester were overlapped with each other such that an absorption axis of the linear polarizing filter and a tensile direction of the tension tester forms an angle of 45°, so as to perform the same evaluation as Example 1.

Comparative Example 2

A polycarbonate film (manufactured by Teijin Limited., WR-W, thickness: 75 μm) was used as a phase difference layer.

Comparative Example 3

A layer obtained by laminating four sheets of polycarbonate films (manufactured by Teijin Limited., WR-W, thickness: 75 μm) by using adhesives (MCS70 manufactured by MeCan Imaging, Inc., thickness: 25 μm) such that the slow axes coincide was used as a phase difference layer.

Comparative Example 4

A polycarbonate film (manufactured by Teijin Limited., PANLITE PC-2151, thickness: 195 μm) was used as a phase difference layer.

Comparative Example 5

A layer obtained by laminating two sheets of polycarbonate films (manufactured by Teijin Limited., PANLITE PC-2151, thickness: 195 μm) by using adhesives (MCS70 manufactured by MeCan Imaging, Inc., thickness: 25 μm) such that the slow axes coincide was used as a phase difference layer.

Comparative Example 6

A phase difference layer was manufactured to be used in the same manner as Example 14 except for adjusting the coating amount of the liquid crystal composition such that the film thickness of the phase difference layer became 0.6 μm.

TABLE 1

| | Re(450)/Re(550) | Re(550) | | Spectral analysis measurement result | | | | | | | | |
|---|---|---|---|---|---|---|---|---|---|---|---|---|
| | | | | Before stretching | | | 0.0005 | | | 0.001 | | |
| Example 1 | 1.00 | 125 nm | L*a*b* | 25.0 | 4.0 | −9.8 | 25.5 | −0.7 | −18.0 | 27.8 | −6.2 | −23.2 |
| | | | Color difference with respect to color before stretching | — | | | 9.4 | | | 17.0 | | |
| Example 2 | 1.00 | 497 nm | L*a*b* | 49.7 | −38.2 | 4.1 | 51.8 | −35.7 | 11.8 | 53.7 | −31.1 | 20.8 |
| | | | Color difference with respect to color before stretching | — | | | 8.3 | | | 18.5 | | |
| Example 3 | 1.00 | 625 nm | L*a*b* | 41.8 | 25.4 | 4.3 | 41.0 | 27.4 | 0.1 | 39.9 | 29.1 | −4.6 |
| | | | Color difference with respect to color before stretching | — | | | 4.8 | | | 9.9 | | |
| Example 4 | 1.07 | 111 nm | L*a*b* | 22.8 | 6.7 | −0.4 | 21.8 | 5.0 | −6.4 | 21.7 | 2.5 | −11.5 |
| | | | Color difference with respect to color before stretching | — | | | 6.3 | | | 11.9 | | |
| Example 5 | 1.07 | 142 nm | L*a*b* | 24.4 | −2.1 | −28.8 | 26.8 | −7.3 | −31.1 | 30.0 | −11.3 | −31.2 |
| | | | Color difference with respect to color before stretching | — | | | 6.2 | | | 11.0 | | |
| Example 6 | 1.07 | 318 nm | L*a*b* | 55.2 | 14.9 | 44.4 | 53.7 | 18.0 | 38.7 | 51.8 | 20.7 | 31.5 |
| | | | Color difference with respect to color before stretching | — | | | 6.7 | | | 14.6 | | |
| Example 7 | 1.07 | 352 nm | L*a*b* | 47.1 | 25.9 | 15.1 | 44.9 | 27.6 | 6.9 | 42.6 | 28.7 | −1.4 |
| | | | Color difference with respect to color before stretching | — | | | 8.7 | | | 17.3 | | |
| Example 8 | 1.07 | 401 nm | L*a*b* | 34.2 | 23.9 | −31.8 | 33.8 | 18.2 | −34.1 | 33.7 | 10.6 | −34.7 |
| | | | Color difference with respect to color before stretching | — | | | 6.1 | | | 13.6 | | |
| Example 9 | 1.07 | 423 nm | L*a*b* | 32.0 | 2.0 | −32.0 | 33.1 | −7.4 | −29.6 | 34.7 | −16.3 | −25.5 |
| | | | Color difference with respect to color before stretching | — | | | 9.7 | | | 19.7 | | |
| Example 10 | 1.07 | 436 nm | L*a*b* | 34.7 | −24.2 | −25.7 | 36.7 | −32.0 | −19.8 | 39.1 | −37.3 | −12.0 |
| | | | Color difference with respect to color before stretching | — | | | 10.0 | | | 19.4 | | |
| Example 11 | 1.07 | 474 nm | L*a*b* | 38.5 | −39.8 | −14.9 | 40.7 | −43.5 | −8.0 | 43.2 | −44.6 | 0.5 |
| | | | Color difference with respect to color before stretching | — | | | 8.2 | | | 16.9 | | |
| Example 12 | 1.07 | 509 nm | L*a*b* | 47.2 | −37.4 | 21.3 | 48.8 | −32.7 | 25.7 | 50.1 | −26.8 | 28.2 |
| | | | Color difference with respect to color before stretching | — | | | 6.7 | | | 12.9 | | |
| Example 13 | 1.07 | 575 nm | L*a*b* | 54.5 | 4.6 | 21.5 | 54.1 | 8.9 | 18.3 | 53.2 | 14.1 | 14.0 |
| | | | Color difference with respect to color before stretching | — | | | 5.4 | | | 12.2 | | |
| Example 14 | 1.12 | 139 nm | L*a*b* | 23.3 | 0.8 | −28.8 | 25.0 | −4.6 | −31.5 | 27.7 | −9.7 | −31.8 |
| | | | Color difference with respect to color before stretching | — | | | 6.3 | | | 11.8 | | |
| Example 15 | 1.12 | 358 nm | L*a*b* | 43.9 | 28.3 | 3.1 | 42.2 | 29.9 | −3.2 | 40.1 | 30.4 | −10.3 |
| | | | Color difference with respect to color before stretching | — | | | 6.7 | | | 14.1 | | |
| Example 16 | 1.12 | 420 nm | L*a*b* | 33.4 | −20.4 | −22.2 | 35.0 | −28.2 | −17.5 | 36.7 | −34.6 | −11.9 |
| | | | Color difference with respect to color before stretching | — | | | 9.3 | | | 17.8 | | |
| Comparative Example 1 | — (Linear polarization filter) | — | L*a*b* | 64.1 | 0.1 | 7.0 | 63.3 | 0.4 | 7.9 | 61.7 | 1.0 | 9.6 |
| | | | Color difference with respect to color before stretching | — | | | 1.3 | | | 3.7 | | |
| Comparative Example 2 | 0.83 | 142 nm | L*a*b* | 23.6 | 0.5 | 2.4 | 23.7 | −2.5 | 0.0 | 25.5 | −6.2 | −3.1 |
| | | | Color difference with respect to color before stretching | — | | | 3.9 | | | 8.9 | | |
| Comparative Example 3 | 0.83 | 568 nm | L*a*b* | 61.0 | −8.0 | 5.0 | 61.3 | −5.5 | 6.7 | 61.1 | −1.5 | 9.7 |
| | | | Color difference with respect to color before stretching | — | | | 3.1 | | | 8.1 | | |
| Comparative Example 4 | 1.07 | 38 nm | L*a*b* | 57.0 | 2.0 | 12.9 | 54.7 | 2.9 | 15.2 | 51.3 | 4.0 | 18.2 |
| | | | Color difference with respect to color before stretching | — | | | 3.4 | | | 8.0 | | |
| Comparative Example 5 | 1.07 | 75 nm | L*a*b* | 42.2 | 7.3 | 21.2 | 38.7 | 8.3 | 19.9 | 36.3 | 8.9 | 17.1 |
| | | | Color difference with respect to color before stretching | — | | | 3.8 | | | 7.4 | | |
| Comparative Example 6 | 1.12 | 55 nm | L*a*b* | 49.6 | 5.0 | 21.1 | 47.4 | 5.9 | 22.3 | 44.5 | 7.1 | 22.9 |
| | | | Color difference with respect to color before stretching | — | | | 2.7 | | | 5.8 | | |

From the results shown in the table above, it is known that, in the examples using the phase difference layers that satisfy 100 nm≤Re (550 nm)≤700 nm and Re (450)/Re (550)≥0.9, greater color differences were observed even in smaller distortion amounts, compared with the comparative examples using the same material.

EXPLANATION OF REFERENCES

1: phase difference layer
2: linear polarizing layer
3: support body
4: alignment layer 10: stress measuring member (form not including stress displaying member)
11: photoelastic layer
12: reflection layer
13: adhesion layer for adherence of respective layers
16: adhesion layer for adherence to measurement subjects
20: stress displaying member
21: measurement subject
101: distortion gauge
103: spectrophotometer

What is claimed is:

1. A stress measuring method comprising:
irradiating a photoelastic product including a measurement subject with light penetrating a linear polarizing film and a phase difference film in this order;
detecting reflected light from the product which is derived from the light via the phase difference film and the linear polarizing film in this order; and
preparing the photoelastic product by adhering a stress displaying member including a photoelastic layer to a surface of the measurement subject
wherein in-plane retardation Re (550) of the phase difference film with light having a wavelength of 550 nm satisfies 100 nm≤Re (550 nm)≤700 nm, and in-plane retardation Re (450) of the phase difference film with light having a wavelength of 450 nm satisfies Re (450)/Re (550)≥0.9 and having an upper limit of 1.07, and
wherein a film thickness of the photoelastic layer is 10 μm to 500 μm.

2. The stress measuring method according to claim 1, further comprising:
preparing the photoelastic product by adhering a stress displaying member including a photoelastic layer and a reflection layer to a surface of the measurement subject, such that the reflection layer is on the measurement subject side.

3. The stress measuring method according to claim 1, wherein the photoelastic layer includes an aromatic compound.

4. The stress measuring method according to claim 1, wherein the phase difference film is a hardened film obtained by hardening liquid crystal composition.

5. The stress measuring method according to claim 4, wherein film thickness of the phase difference film is 1 μm to 10μm.

6. A stress measuring member, comprising:
a linear polarizing layer;
a phase difference layer; and
a photoelastic layer,
wherein in-plane retardation Re (550) of the phase difference layer with light having a wavelength of 550 nm satisfies 100 nm≤Re (550 nm)≤700 nm, and in-plane retardation Re (450) of the phase difference film with light having a wavelength of 450 nm satisfies Re (450)/Re (550)≥0.9 and having an upper limit of 1.07,
wherein the linear polarizing layer, the phase difference layer, and the photoelastic layer are arranged in this order, and
wherein a film thickness of the photoelastic layer is 10 μm to 500 μm.

7. The stress measuring member according to claim 6, further comprising:
a photoelastic layer; and
a reflection layer,
wherein the linear polarizing layer, the phase difference layer, the photoelastic layer, and the reflection layer are arranged in this order.

8. The stress measuring member according to claim 6, further comprising:
an adhesion layer for adherence to a measurement subject,
wherein the linear polarizing layer, the phase difference layer, the photoelastic layer, and the adhesion layer are arranged in this order.

9. The stress measuring member according to claim 6, wherein the photoelastic layer includes an aromatic compound.

10. The stress measuring method according to claim 6, wherein the phase difference layer is a hardened film obtained by hardening liquid crystal composition.

11. A stress measuring set, comprising:
a stress measuring member; and
a stress displaying member,
wherein the stress measuring member includes a linear polarizing layer and a phase difference layer,
wherein in-plane retardation Re (550) of the phase difference layer with light having a wavelength of 550 nm satisfies 100 nm≤Re (550 nm)≤700 nm, and in-plane retardation Re (450) of the phase difference film with light having a wavelength of 450 nm satisfies Re (450)/Re (550)≥0.9 and having an upper limit of 1.07,
wherein the stress displaying member includes a photoelastic layer, and
wherein a film thickness of the photoelastic layer is 10 μm to 500 μm.

12. The stress measuring set according to claim 11, wherein the stress displaying member includes a reflection layer.

13. The stress measuring set according to claim 11, wherein the stress displaying member includes an adhesion layer.

14. The stress measuring set according to claim 12, wherein the stress displaying member includes an adhesion layer, and
wherein the photoelastic layer, the reflection layer, and the adhesion layer are arranged in this order.

15. The stress measuring set according to claim 11, wherein the photoelastic layer includes an aromatic compound.

* * * * *